(12) United States Patent
Yoakim et al.

(10) Patent No.: US 9,731,892 B2
(45) Date of Patent: Aug. 15, 2017

(54) CAPSULE AND METHOD FOR PREPARING A FOOD LIQUID BY CENTRIFUGATION

(71) Applicant: NESTEC S.A., Vevey (CH)

(72) Inventors: Alfred Yoakim, St. Legier la Chiesaz (CH); Jean-Paul Denisart, La Conversion (CH); Antoine Ryser, Lausanne (CH); Alexandre Perentes, Lausanne (CH)

(73) Assignee: Nestec S.A., Vevey (CH)

(*) Notice: Subject to any disclaimer, the term of this patent is extended or adjusted under 35 U.S.C. 154(b) by 0 days.

(21) Appl. No.: 14/619,841

(22) Filed: Feb. 11, 2015

(65) Prior Publication Data

US 2015/0151905 A1    Jun. 4, 2015

Related U.S. Application Data

(62) Division of application No. 12/602,577, filed as application No. PCT/EP2008/056968 on Jun. 5, 2008, now Pat. No. 8,986,764.

(30) Foreign Application Priority Data

Jun. 5, 2007 (EP) .................................. 07109579
Jun. 5, 2007 (EP) .................................. 07109580
(Continued)

(51) Int. Cl.
*B65D 85/804* (2006.01)
*A23F 5/26* (2006.01)
*A47J 31/22* (2006.01)

(52) U.S. Cl.
CPC .......... *B65D 85/8043* (2013.01); *A23F 5/262* (2013.01); *A47J 31/22* (2013.01)

(58) Field of Classification Search
CPC ............ B65D 85/8043; B65D 85/8046; B65D 85/804; A47J 31/00; A47J 31/06;
(Continued)

(56) References Cited

U.S. PATENT DOCUMENTS

| 239,659 A | 4/1881 | Houston et al. |
| 1,963,476 A | 6/1934 | Smith |

(Continued)

FOREIGN PATENT DOCUMENTS

| AT | 197553 B | 5/1958 |
| BE | 894031 A1 | 2/1983 |

(Continued)

OTHER PUBLICATIONS

European Search Report, Appl. No. 09174573, Apr. 9, 2010.
(Continued)

*Primary Examiner* — Michele L Jacobson
*Assistant Examiner* — Ericson M Lachica
(74) *Attorney, Agent, or Firm* — Winston & Strawn LLP

(57) ABSTRACT

A single-use capsule for preparing a food liquid from a food substance contained therein. The capsule has an upper wall, a lower wall, and a side wall connecting the upper and lower walls, wherein the walls form an enclosure that contains the food substance. The capsule also has a sealed interface connecting the upper and lower walls and a liquid collecting cavity located between the side wall and sealed interface. The sealed interface is configured to open under a predetermined fluid pressure in the capsule to allow the food liquid to leave the capsule. Also, a method for preparing a food liquid from the capsule by passing water through the food substance using centrifugal forces for producing the food liquid.

24 Claims, 15 Drawing Sheets

(30) Foreign Application Priority Data

Feb. 29, 2008 (EP) .................................... 08102147
Feb. 29, 2008 (EP) .................................... 08102148

(58) Field of Classification Search
CPC ............... A47J 31/0657; A47J 31/0668; A47J 31/0673; A47J 31/22; A47J 31/24; A47J 31/32; A47J 31/34; A47J 31/3623; A47J 31/3666; A47J 31/368; A47J 31/369; A47J 31/3695; A47J 31/40; A47J 31/407; A47J 31/02; A47J 31/0642; A47J 31/0647; A47J 31/0652; A47J 31/0663; A47J 31/0678; A47J 31/0684; A47J 31/0689; A47J 31/10; A47J 31/18; A47J 31/20; A23F 5/262; A23F 5/26

See application file for complete search history.

(56) References Cited

U.S. PATENT DOCUMENTS

| | | | |
|---|---|---|---|
| 2,778,739 | A | 1/1957 | Rodth |
| 2,899,886 | A | 8/1959 | Rodth |
| 2,952,202 | A | 9/1960 | Renner et al. |
| 3,025,781 | A | 3/1962 | Bossi |
| 3,233,535 | A | 2/1966 | Fowlie |
| 3,566,770 | A | 3/1971 | Crossley |
| 3,654,852 | A | 4/1972 | Rosan |
| 3,812,773 | A | 5/1974 | Hultsch |
| 3,822,013 | A | 7/1974 | Van Der Veken |
| 3,967,546 | A | 7/1976 | Cailliot |
| 3,985,069 | A | 10/1976 | Cavalluzzi |
| 4,136,202 | A | 1/1979 | Favre |
| 4,426,919 | A | 1/1984 | Rhoten |
| 4,464,982 | A | 8/1984 | Leuschner et al. |
| 4,473,002 | A | 9/1984 | Leuschner et al. |
| 4,545,296 | A | 10/1985 | Ben-Shmuel |
| 4,584,101 | A | 4/1986 | Kataoka |
| 4,806,375 | A | 2/1989 | Favre |
| 4,846,052 | A | 7/1989 | Favre et al. |
| 4,859,337 | A | 8/1989 | Woltermann |
| 4,962,693 | A | 10/1990 | Miwa et al. |
| 5,047,252 | A | 9/1991 | Liu et al. |
| 5,265,517 | A | 11/1993 | Gilbert |
| 5,300,308 | A | 4/1994 | Louridas |
| 5,325,765 | A | 7/1994 | Sylvan et al. |
| 5,343,799 | A | 9/1994 | Fond |
| 5,566,605 | A | 10/1996 | Lebrun et al. |
| 5,637,335 | A | 6/1997 | Fond et al. |
| 5,649,472 | A | 7/1997 | Fond et al. |
| 5,656,311 | A | 8/1997 | Fond |
| 5,755,149 | A | 5/1998 | Blanc et al. |
| 5,773,067 | A | 6/1998 | Freychet et al. |
| 5,826,492 | A | 10/1998 | Fond et al. |
| 5,948,455 | A | 9/1999 | Schaeffer et al. |
| 6,007,853 | A | 12/1999 | Lesser |
| 6,068,871 | A * | 5/2000 | Fond .................. B65D 85/8046 426/112 |
| 6,607,762 | B2 | 8/2003 | Lazaris et al. |
| 6,777,007 | B2 | 8/2004 | Cai |
| 6,786,134 | B2 | 9/2004 | Green |
| 6,849,285 | B2 | 2/2005 | Masek et al. |
| 6,854,378 | B2 | 2/2005 | Jarisch et al. |
| 7,017,775 | B2 | 3/2006 | Zettle et al. |
| 7,153,530 | B2 | 12/2006 | Masek et al. |
| 7,216,582 | B2 | 5/2007 | Yoakim et al. |
| 7,325,478 | B2 | 2/2008 | Cautenet et al. |
| 7,325,479 | B2 | 2/2008 | Laigneau et al. |
| 7,469,627 | B2 | 12/2008 | Li |
| 7,569,242 | B2 | 8/2009 | Barber et al. |
| 7,569,243 | B2 | 8/2009 | Yoakim et al. |
| 7,770,512 | B2 | 8/2010 | Albrecht |
| 7,981,451 | B2 | 7/2011 | Ozanne |
| 8,151,694 | B2 | 4/2012 | Jacobs et al. |
| 8,307,754 | B2 | 11/2012 | Ternite et al. |
| 8,327,754 | B2 | 12/2012 | Kirschner et al. |
| 8,409,646 | B2 | 4/2013 | Yoakim et al. |
| 8,431,175 | B2 | 4/2013 | Yoakim et al. |
| 8,512,784 | B2 | 8/2013 | Denisart et al. |
| 8,813,634 | B2 | 8/2014 | Yoakim et al. |
| 2003/0116029 | A1 | 6/2003 | Kollep |
| 2003/0145736 | A1 | 8/2003 | Green |
| 2003/0159593 | A1 | 8/2003 | Leutwyler |
| 2003/0189872 | A1 | 10/2003 | Artman et al. |
| 2004/0255790 | A1 | 12/2004 | Green |
| 2005/0150390 | A1 | 7/2005 | Schifferle |
| 2005/0188854 | A1 | 9/2005 | Green et al. |
| 2006/0003075 | A1 | 1/2006 | Meador |
| 2006/0110507 | A1 | 5/2006 | Yoakim et al. |
| 2006/0196364 | A1 | 9/2006 | Kirschner |
| 2006/0236871 | A1 | 10/2006 | Ternite et al. |
| 2007/0079708 | A1 | 4/2007 | Li |
| 2007/0248734 | A1 | 10/2007 | Denisart et al. |
| 2007/0289453 | A1 | 12/2007 | Halliday et al. |
| 2008/0014860 | A1 | 1/2008 | Heitman et al. |
| 2008/0028946 | A1 * | 2/2008 | Kirschner ............ B65D 85/804 99/287 |
| 2008/0038414 | A1 | 2/2008 | Veciana I Membrado et al. |
| 2008/0122286 | A1 | 5/2008 | Brock et al. |
| 2008/0187638 | A1 | 8/2008 | Hansen |
| 2009/0032454 | A1 | 2/2009 | Rapparini |
| 2009/0050540 | A1 | 2/2009 | Imai et al. |
| 2009/0136639 | A1 | 5/2009 | Doglioni Majer |
| 2009/0155422 | A1 | 6/2009 | Ozanne |
| 2009/0173642 | A1 * | 7/2009 | Blanc .................. B65D 85/8046 206/5 |
| 2009/0218877 | A1 | 9/2009 | Derman |
| 2010/0024658 | A1 | 2/2010 | Jacobs et al. |
| 2010/0064899 | A1 | 3/2010 | Aardenburg |
| 2010/0108541 | A1 | 5/2010 | Roberto |
| 2010/0173056 | A1 | 7/2010 | Yoakim et al. |
| 2010/0176004 | A1 | 7/2010 | Schneider et al. |
| 2010/0178392 | A1 | 7/2010 | Yoakim et al. |
| 2010/0178404 | A1 | 7/2010 | Yoakim et al. |
| 2010/0186599 | A1 | 7/2010 | Yoakim et al. |
| 2010/0203208 | A1 | 8/2010 | Yoakim et al. |
| 2010/0239734 | A1 | 9/2010 | Yoakim et al. |
| 2011/0041702 | A1 | 2/2011 | Yoakim et al. |
| 2011/0052761 | A1 | 3/2011 | Yoakim et al. |
| 2011/0189362 | A1 | 8/2011 | Denisart et al. |
| 2011/0217421 | A1 | 9/2011 | Perentes et al. |
| 2011/0244099 | A1 | 10/2011 | Perentes et al. |
| 2011/0262601 | A1 | 10/2011 | Manser et al. |
| 2012/0058226 | A1 | 3/2012 | Winkler et al. |

FOREIGN PATENT DOCUMENTS

| | | |
|---|---|---|
| CA | 2 625 215 A1 | 4/2007 |
| CN | 1656983 A | 8/2005 |
| CN | 101001555 A | 7/2007 |
| DE | 2 151 920 A | 4/1973 |
| DE | 32 41 606 A1 | 3/1984 |
| DE | 35 29 053 A1 | 2/1987 |
| DE | 35 29 204 A1 | 2/1987 |
| DE | 37 19 962 C1 | 6/1988 |
| DE | 42 40 429 A1 | 6/1994 |
| DE | 44 39 252 A1 | 5/1996 |
| DE | 103 55 671 A1 | 6/2004 |
| DE | 10 2005 007 852 A1 | 8/2006 |
| EP | 0 242 556 A1 | 10/1987 |
| EP | 0 250 810 A1 | 1/1988 |
| EP | 0 367 600 A1 | 5/1990 |
| EP | 0 512 470 B1 | 11/1992 |
| EP | 0 521 187 A1 | 1/1993 |
| EP | 0 521 510 A1 | 1/1993 |
| EP | 0 607 759 A1 | 7/1994 |
| EP | 0 651 963 B1 | 5/1995 |
| EP | 0 749 713 B1 | 12/1996 |
| EP | 0 806 373 B1 | 11/1997 |
| EP | 1 208 782 B1 | 5/2002 |
| EP | 1 299 022 B1 | 4/2003 |
| EP | 1 654 966 B1 | 5/2006 |
| EP | 1 774 878 A1 | 4/2007 |
| EP | 1 813 333 A2 | 8/2007 |

(56) References Cited

FOREIGN PATENT DOCUMENTS

| | | |
|---|---|---|
| EP | 2 000 062 A1 | 12/2008 |
| EP | 2 155 021 B1 | 2/2010 |
| FR | 2 132 310 A1 | 11/1972 |
| FR | 2 487 661 A1 | 2/1982 |
| FR | 2 513 106 A1 | 3/1983 |
| FR | 2 531 849 A1 | 2/1984 |
| FR | 2 535 597 A1 | 5/1984 |
| FR | 2 617 389 A1 | 1/1989 |
| FR | 2 624 364 A1 | 6/1989 |
| FR | 2 685 186 A1 | 6/1993 |
| FR | 2 686 007 A1 | 7/1993 |
| FR | 2 726 988 A1 | 5/1996 |
| FR | WO 2008025730 A1 * 3/2008 ......... B65D 85/8043 |
| GB | 1 506 074 A | 4/1978 |
| GB | 2 227 405 A | 8/1990 |
| GB | 2 253 336 A | 9/1992 |
| GB | 2 416 480 A | 2/2006 |
| JP | 50-16225 A | 2/1975 |
| JP | 59-82817 A | 5/1984 |
| JP | 62-254719 A | 11/1987 |
| JP | 63-34581 U | 3/1988 |
| JP | 2-124111 A | 5/1990 |
| JP | 2-189114 A | 7/1990 |
| JP | 6-104091 A | 12/1994 |
| JP | 6-339431 A | 12/1994 |
| JP | 3034606 U | 2/1997 |
| JP | 2001-61663 A | 3/2001 |
| JP | 2002-189115 A | 7/2002 |
| JP | 2002-215414 A | 8/2002 |
| JP | 2003-144973 A | 5/2003 |
| JP | 2004-517654 A | 6/2004 |
| JP | 2005-516602 A | 6/2005 |
| JP | 2005-199071 A | 7/2005 |
| JP | 2005-525146 A | 8/2005 |
| JP | 2006-515764 A | 6/2006 |
| JP | 2006-518226 A | 8/2006 |
| JP | 2008-508041 A | 3/2008 |
| JP | 2008-520298 A | 6/2008 |
| TW | 200718383 | 5/2007 |
| WO | 94/02059 A1 | 2/1994 |
| WO | 02/17760 A1 | 3/2002 |
| WO | 02/35977 A1 | 5/2002 |
| WO | 2004/030500 A1 | 4/2004 |
| WO | 2005/066040 A2 | 7/2005 |
| WO | 2006/082064 A1 | 8/2006 |
| WO | 2006/112691 A1 | 10/2006 |
| WO | 2007/014584 A1 | 2/2007 |
| WO | 2007/041954 A1 | 4/2007 |
| WO | 2007/042414 A1 | 4/2007 |
| WO | WO 2007042414 A1 * 4/2007 ......... B65D 85/8043 |
| WO | 2007/085921 A2 | 8/2007 |
| WO | 2007/110768 A2 | 10/2007 |
| WO | 2008/087099 A2 | 7/2008 |
| WO | 2008/148601 A1 | 12/2008 |
| WO | 2008/148604 A1 | 12/2008 |
| WO | 2008/148646 A1 | 12/2008 |
| WO | 2008/148650 A1 | 12/2008 |
| WO | 2008/148656 A1 | 12/2008 |
| WO | 2009/050540 A1 | 4/2009 |
| WO | 2009/106175 A1 | 9/2009 |
| WO | 2009/106598 A1 | 9/2009 |
| WO | 2009/133134 A1 | 11/2009 |
| WO | 2010/026045 A1 | 3/2010 |
| WO | 2010/026053 A1 | 3/2010 |
| WO | 2010/038213 A2 | 4/2010 |
| WO | 2010/041179 A2 | 4/2010 |

OTHER PUBLICATIONS

International Search Report and Written Opinion, PCT/EP2008/054401, Sep. 11, 2008.
International Search Report and Written Opinion, PCT/EP2008/054810, Oct. 24, 2008.
International Search Report and Written Opinion, PCT/EP2008/056345, Oct. 1, 2008.
International Search Report and Written Opinion, PCT/EP2008/056310, Oct. 8, 2008.
International Search Report and Written Opinion, PCT/EP2008/056412, Sep. 11, 2008.
International Search Report and Written Opinion, PCT/EP/2008/056968, Oct. 7, 2008.
International Search Report, PCT/EP2009/060697, Feb. 9, 2010.
International Search Report, PCT/EP2009/060771, Feb. 8, 2010.
Green Mountain Coffee, "New K-Cup Samplers Offer More Variety," 5 pages, Jul. 11, 2008. Accessed Mar. 6, 2012, http://www.greenmountaincafe.com/2008/07/new-k-cup-samplers-offer-more-variety/.
Chilean patent application No. CL-1652-2008, filed Jun. 5, 2008 (see English equivalent US 2010/0173056 and WO 2008/148601).
Chilean patent application No. CL-1653-2008, filed Jun. 5, 2008 (see English equivalent US 2010/0186599 and WO 2008/148604).
Chilean patent application No. CL-1655-2008, filed Jun. 5, 2008 (see English equivalent US 2010/0178404 and WO 2008/148646).
BE 894031 machine translation: accessed from EPO Jul. 10, 2012.
DE 4240429 machine translation: accessed from EPO Jul. 10, 2012.
U.S. Appl. No. 12/602,542, filed Dec. 1, 2009.
U.S. Appl. No. 12/602,553, filed Dec. 1, 2009.
U.S. Appl. No. 12/602,562, filed Dec. 1, 2009.
U.S. Appl. No. 12/602,568, filed Dec. 1, 2009.
U.S. Appl. No. 12/602,730, filed Dec. 2, 2009.
U.S. Appl. No. 12/776,155, filed May 7, 2010.
U.S. Appl. No. 12/856,369, filed Aug. 13, 2010.
U.S. Appl. No. 12/860,705, filed Aug. 20, 2010.
U.S. Appl. No. 13/061,558, filed Mar. 1, 2011.
U.S. Appl. No. 13/061,567, filed Mar. 1, 2011.
U.S. Appl. No. 13/133,613, filed Jun. 8, 2011.
U.S. Appl. No. 12/602,542, Non-Final Office Action, Apr. 13, 2012.
U.S. Appl. No. 12/602,542, Final Office Action, Oct. 4, 2012.
U.S. Appl. No. 12/602,542, Non-Final Office Action, Jun. 18, 2013.
U.S. Appl. No. 12/602,542, Non-Final Office Action, Jan. 13, 2015.
U.S. Appl. No. 12/602,542, Final Office Action, Jan. 30, 2014.
U.S. Appl. No. 12/602,553, Non-Final Office Action, May 11, 2012.
U.S. Appl. No. 12/602,553, Non-Final Office Action, Aug. 23, 2012.
U.S. Appl. No. 12/602,553, Final Office Action, Apr. 11, 2013.
U.S. Appl. No. 12/602,553, Final Office Action, May 8, 2014.
U.S. Appl. No. 12/602,553, Non-Final Office Action, Jan. 13, 2015.
U.S. Appl. No. 12/602,562, Non-Final Office Action, Feb. 13, 2012.
U.S. Appl. No. 12/602,562, Final Office Action, Jun. 22, 2012.
U.S. Appl. No. 12/602,562, Non-Final Office Action, Jul. 17, 2014.
U.S. Appl. No. 12/602,568, Non-Final Office Action, Mar. 20, 2012.
U.S. Appl. No. 12/602,568, Final Office Action, Jul. 16, 2012.
U.S. Appl. No. 12/602,568, Non-Final Office Action, Oct. 19, 2012.
U.S. Appl. No. 12/602,568, Notice of Allowance, Feb. 1, 2013.
U.S. Appl. No. 12/602,730, Non-Final Office Action, May 17, 2012.
U.S. Appl. No. 12/602,730, Final Office Action, Sep. 18, 2012.
U.S. Appl. No. 12/602,730, Advisory Action, Jan. 18, 2013.
U.S. Appl. No. 12/602,730, Non-Final Office Action, Dec. 17, 2013.
U.S. Appl. No. 12/776,155, Non-Final Office Action, Jul. 18, 2012.
U.S. Appl. No. 12/776,155, Notice of Allowance, Mar. 1, 2013.
U.S. Appl. No. 12/856,369, Restriction Requirement, Feb. 15, 2013.
U.S. Appl. No. 12/856,369, Non-Final Office Action, Jul. 30, 2013.
U.S. Appl. No. 12/860,705, Non-Final Office Action, Mar. 16, 2012.
U.S. Appl. No. 12/860,705, Final Office Action, Jul. 18, 2012.
U.S. Appl. No. 13/061,558, Non-Final Office Action, Dec. 6, 2012.
U.S. Appl. No. 13/061,558, Final Office Action, May 21, 2013.
U.S. Appl. No. 13/061,558, Non-Final Office Action, Feb. 14, 2014.
U.S. Appl. No. 13/061,558, Notice of Allowance, Sep. 26, 2014.
U.S. Appl. No. 13/061,567, Non-Final Office Action, May 10, 2013.
U.S. Appl. No. 13/061,567, Notice of Allowance, Jun. 11, 2013.
U.S. Appl. No. 13/133,613, Restriction Requirement, Mar. 28, 2013.
U.S. Appl. No. 13/133,613, Non-Final Office Action, Jul. 18, 2013.
U.S. Appl. No. 13/133,613, Final Office Action, Mar. 21, 2014.

* cited by examiner

CAPSULE AND METHOD FOR PREPARING A FOOD LIQUID BY CENTRIFUGATION

CROSS REFERENCE TO RELATED APPLICATIONS

This application is a division of U.S. patent application Ser. No. 12/602,577 filed on Dec. 1, 2009, which is a 371 filing of International patent application no. PCT/EP2008/056968 filed on Jun. 5, 2008, which claims priority to European patent applications nos. 07109579.8 filed on Jun. 5, 2007, Ser. No. 07/109,580.6 filed on Jun. 5, 2007, Ser. No. 08/102,147.9 filed on Feb. 29, 2008 and 08102148.7 filed on Feb. 29, 2008.

BACKGROUND

The present invention relates in general manner to a capsule system and method for preparing a food liquid from a food substance contained in a receptacle by passing water through the substance using centrifugal forces.

It is known to prepare beverages wherein a mixture consisting of brewed coffee and coffee powder is separated with centrifugal forces. Such a mixture is obtained by bringing hot water and coffee powder together for a defined time. The water is then forced through a screen, on which screen powder material is present.

Existing systems consist of placing the coffee powder in a receptacle which is usually a non-removable part of a machine such as in EP 0367 600B1. Such devices have many disadvantages. Firstly, the coffee powder must be properly dosed manually in the receptacle. Secondly, the centrifuged coffee waste becomes dry and it must be removed by scraping the surface of the receptacle. As a result, the coffee preparation requires a lot of manual handling and is so very time consuming. Usually coffee freshness can also vary a lot and this can impact on the cup quality because coffee comes generally from bulk package or coffee is ground from beans in the receptacle itself.

Also, depending on the manual dosage of coffee and the brewing conditions (e.g., centrifugal speed, receptacle size) the cup quality can vary a lot.

Therefore, these systems have never reached an important commercial success.

In German patent application DE 102005007852, the machine comprises a removable holder into which an open cup-shaped part of the receptacle is placed; the other part or lid being attached to a driving axis of the machine. However, a disadvantage is the intensive manual handling. Another disadvantage is the difficulty to control quality of the coffee due to a lack of control for the dosing of the powder and a lack of control of the freshness of the coffee powder.

Other devices for brewing coffee by centrifuge forces are described in WO 2006/112691; FR2624364; EP0367600; GB2253336; FR2686007; EP0749713; DE4240429; EP0651963; FR2726988; DE4439252; EP0367600; FR2132310; FR2513106; FR2487661; DE3529053; FR2535597; WO2007/041954; DE3529204; DE3719962; FR2685186; DE3241606 and U.S. Pat. No. 4,545,296.

However, the effect of centrifugal forces to brew coffee or prepare other food substances presents many advantages compared to the normal brewing methods using pressure pumps. For example, in "espresso" coffee-type brewing methods, it is very difficult to master all the parameters which influence the quality of extraction of the delivered coffee extract. These parameters are typically the pressure, the flow rate which decreases with the pressure, the compaction of the coffee powder which also influences the flow characteristics and which depends on the coffee ground particle size, the temperature, the water flow distribution and so on.

Therefore, there is a need for proposing a new capsule system and a method adapted therefore for which the extraction parameters can be better and more independently controlled and therefore can be better mastered for controlling quality of the delivered food liquid.

At the same time, there is a need for a way of preparing a food liquid which is more convenient compared to the prior art centrifugal coffee preparation devices and which provides a better in-cup quality with a higher control of important quality parameters such as freshness and accurate dosage of the substance in the receptacle.

SUMMARY OF THE INVENTION

Therefore, the invention relates to a liquid food preparation device for preparing a liquid food from a food substance contained in a single-use capsule, removably insertable in the device, by passing water through the substance in the capsule, comprising a water injection head in the capsule and a capsule holder for holding the capsule in the device, characterized in that it comprises:
- a water injector, as part of the water injection head, arranged for introducing water along a central axis relative to the capsule holder,
- means for driving the capsule holder in centrifugation around an axis of rotation (I) aligned with said central axis of the capsule holder and,
- at least one opening means for providing at least one liquid delivery outlet in the capsule which is placed in a position relatively offset to said central axis of the capsule holder.

In a mode, the said opening means for providing the liquid delivery outlet(s) is at least one piercing member and/or cutting member and/or burning member.

More particularly, the water injecting head comprises a non-moving water injector and a rotary engaging member for engaging the capsule in closure onto the capsule holder. The engaging member thus rotates in conjunction with the capsule holder during centrifugation of the capsule in the device.

In one mode, the opening means of the liquid delivery outlet(s), e.g., piercing members or other means, can be part of the rotary engaging member of the water injection head.

In an alternative possible configuration, the opening means of the liquid delivery, e.g., piercing members or other means, can be part of the capsule holder.

In a mode, the opening means comprises a series of opening means, e.g., piercing members or other means, distributed along a substantially circular path about the central axis.

The opening means, e.g., piercing members, engages the capsule in such a way that the rotational momentum can be transmitted from the device to the capsule.

In a first mode, the opening members, e.g. piercing members, can be arranged in the device in such a manner to pierce the outlet(s) of the capsule during closure of the device about the capsule. In particular, the opening members are mounted on the rotary engaging member or capsule holder to open the capsule, e.g., pierce the liquid inlet(s) in the capsule, during relative engagement or closure of the rotary engaging member and the capsule holder about the capsule. For instance, piercing members are placed sufficiently in relief relative to the surface of the water injection head to pierce the capsule when the head approaches and engages the capsule in closure.

Preferably, the series of piercing members comprises at least four members for forming at least four small liquid delivery outlets at the periphery of the capsule. The piercing members can be distributed at 90-degree intervals therefore providing a homogeneous liquid delivery at the periphery of the capsule.

The piercing members can engage the capsule and so participate to transfer the rotational momentum to the capsule during rotation.

In another mode, the opening members are configured to create the liquid delivery outlet(s) of the capsule after a certain quantity of water is filled in the capsule.

The capsule may comprise a perforable membrane made of an aluminium and/or polymer materials. In particular, the puncturable membrane can have a thickness between 10 and 200 microns.

In a possible aspect of the invention, the water injector also comprises an opening means such as a piercing member. The opening means can be a piercing member arranged as a hollow piercing tube for injecting water in the centre of the capsule.

The piercing member of the water injector has a diameter of less than 5 mm, preferably, between 0.9 and 2.9 mm. Indeed, the pressure in the capsule increases from the centre to the periphery. The pressure of water in the centre can be close to zero but can gradually increase outwardly. Therefore, a small diameter of the injector provides a small inlet in the capsule to reduce the pressure at the inlet side of the capsule.

The driving means of the capsule holder can be directly connected to the capsule holder or indirectly connected to the capsule holder. A direct connection to the capsule holder can be obtained by a rotational drive assembly comprising a rotary motor and a drive transmission connecting the motor to the bottom of the capsule holder. The drive transmission may comprise a suitable gear reduction or amplification to provide the correct transmission rate to the capsule holder in function of the motor speed. An indirect connection to the capsule holder can be obtained by transmission of the rotational momentum from the water injection head to the capsule holder. In this case, the drive transmission of the rotational drive assembly is connected directly to the upper side of the water injection head, in particular to the rotary engaging member of the head.

The device of the invention may receive capsules made of rigid, semi-rigid and/or soft materials. The capsule may be made of materials such as plastics, aluminium, cellulose-based materials or other biodegradable materials, and combinations therefore. Preferably, the capsule has a peripheral wall made of a pierceable membrane. The membrane can form a sealing lid covering a cup-shaped body which receives the food substance to be brewed.

In a mode, a valve means is arranged downstream of the opening means of the at least one liquid delivery outlet of the capsule. The valve means may comprise an annular closure ring and an elastic means for elastically engaging the ring in closure onto a peripheral part, e.g., an edge, of the capsule.

The invention also relates to a method for preparing a food liquid from a food substance contained in a single-use capsule by passing water through the substance comprising:
  driving the capsule in centrifugal rotation while introducing water in the centre of capsule,
  passing water through the substance to form a food liquid,
  opening at least one liquid delivery outlet in the capsule which is peripherally offset relative to the centre of the capsule and delivering said liquid from said at least one liquid delivery outlet.

In a possible aspect of the method, the at least one liquid delivery outlet is obtained by piercing the capsule in the device. Thus, the capsule can be a gas tightly sealed capsule comprising ingredients such as ground coffee, instant coffee, leaf tea, cocoa, chocolate, a creamer, sweetener, and combinations thereof which can be preserved in protected atmosphere conditions for an extended period of time. The capsule is thus opened at the time of use in the device.

According to an aspect of the method, at least one liquid delivery outlet is obtained by piercing a sealing membrane of the capsule. The membrane can be formed of plastic and/or metal material.

In a mode of the invention, the at least one inlet opening is carried out by mechanical piercing effect of the capsule, e.g., with an external piercing means of the device being displaced relatively to the capsule.

In this case, piercing is carried out when the capsule is inserted in the device such as by effect of the device closing about the capsule.

According to the method, water is introduced in the capsule through an opening of less than 5 mm, preferably between 0.9 and 2.9 mm. As aforementioned, a sufficiently small water inlet is preferred in the capsule in order to reduce the internal pressure of liquid at the inlet side of the capsule and therefore avoid leakage problems.

Preferably, water is introduced in the centre of the capsule after having pierced a water inlet in the centre of the capsule.

According to an aspect of the invention, the food liquid delivered from the capsule is passed via a flow restriction means. The flow restriction means can be configured for providing a pressure drop of at least 0.5 bar of relative pressure during centrifugation. Preferably, the flow restriction means is configured for providing a pressure drop of between 1 and 6 bar, most preferably between 1.5 and 4 bar, of relative pressure during centrifugation. A flow restriction within the flow path of the centrifuged liquid enables to control the release of the centrifuged liquid for improving the interaction of water with the substance within the capsule as well as providing eventually foam to the liquid by the pressure release and the shear stresses which are created at the restriction. More particularly, the flow restriction means enables to maintain a pressure of several bars at the periphery of the enclosure and to retard the release of the liquid.

More particularly, the liquid delivered from the capsule opens a valve for opening when a certain pressure is exerted on the valve by the centrifuged liquid. The valve also regulates the flow of liquid and it reduces the risk of blocking the small outlets provided in the capsule by small size particles, e.g., coffee fines, in particular, at relatively low pressure values.

The valve can be part of the capsule or can be part of the device.

As a result, the system of the invention provides a solution for preparing a food liquid wherein a controlled release of the food liquid can be carried out. For example, the release of liquid can be delayed until a certain pressure is exerted on the valve means. A delayed opening of the valve means enables to improve the interaction between water and the substance contained in the capsule and reduces the risk of the flow blocking in the capsule.

For coffee, for example, it may be advantageous to optimize interaction of water and the ground coffee particles to obtain a good extraction of the coffee and aroma compounds. Moreover, the valve means provides a restriction which may improve the creation of foam or coffee crema.

The valve means can be formed by at least one engaging portion of the device which moves relatively to an engaging portion of the capsule under the effect of the pressurized liquid for making a thin annular laminating passage for the liquid. The laminating passage also enables to create a liquid jet of relatively high velocity that impacts on a wall of the device. As a result, a relatively high amount of foam can be created both due to the restriction that is created by the valve means and by the impact of the liquid on the impact surface of the device at a relatively high velocity during centrifugation. Depending on the amount of pressure exerted on the valve means by the centrifuged liquid, the restriction caused by the valve means can differ in amplitude.

In a possible mode, the valve means can be calibrated or adjusted to selectively open a liquid passage through the device at a threshold of pressure in the capsule.

The liquid delivered from the capsule can also be filtered by filtering means provided in the capsule. Such a configuration has many advantages because the device is simplified, the filter does not require cleaning since it is discarded with the capsule.

The invention also relates to a single-use capsule for preparing a food liquid from a food substance contained in the capsule by introducing water in the capsule and passing water through the substance using the centrifugal forces for producing the food liquid which is centrifuged peripherally in the capsule relatively to a central axis of the capsule corresponding to an axis of rotation during the centrifugation, comprising:

an upper wall and a bottom wall,
a widening side wall connecting to the upper and lower walls and,
an enclosure containing a predetermined amount of a food substance.

In a preferred mode, the widening side wall forms an angle C of less than 80 degrees relative to the upper wall. In particular, the widening side wall forms an angle C between 50 and 70 degrees, more preferably of about 60 degrees, relative to the upper wall.

Therefore, the angle of the widening sidewall has been determined to promote the exit of the liquid extract from the capsule at the outlet side of the capsule, i.e., at an annular, peripheral portion of the upper wall of the capsule. In particular, an angle of about 60 degrees has shown remarkable results whereas an angle of 85 degrees has shown poor results (i.e., coffee does not come out of the capsule).

Preferably, the upper wall comprises an outlet region dedicated for being opened for release of the beverage. In particular, the outlet region can be a first dedicated peripheral region of said wall.

The upper wall may also comprise a second region which is a central one and which is dedicated for being pierced by a water inlet means of the device. For instance the central region is a circular region of a perforable membrane. Outside of said first and second perforable regions, the upper wall might not be perforable. For this, an inner lid or dish part may be provided below the wall to reinforce it and to prevent accidental perforation of the upper wall, e.g., membrane, by an external piercing means.

In particular, said peripheral outlet region is part of a puncturable membrane which is dedicated for being pierced for providing the beverage outlets. The number of pierced outlets can range of from 1 to 20, preferably of from 3 to 10 outlets. The membrane provides the important advantage that it gives more freedom to create the water inlet and liquid outlets at the suitable locations and in the suitable number.

In order to filter the liquid in the capsule before it is centrifuged out through the (e.g., pierced) outlets, a filter part is positioned in the capsule to separate a cavity containing the substance and a cavity for collecting the centrifuged liquid.

In order to promote the exit of the liquid through the capsule, the filter part can be inclined relative to the widening sidewall. In a particular mode, for a larger filtering area, the filter part can extend across the whole thickness of the enclosure. For instance, the filter part can be substantially cylindrical. More specifically, the filter part can be an integral extension part of an internal lid of the capsule. The capsule can be designed with a limited number of pieces and can be assembled in a more economical and simpler manner. In a different mode, the filter part is substantially parallel to the upper wall. In this case, the filter part is spaced from the upper wall by a small gap. The capsule may thus be designed more compact with an optimized volume of the substance.

According to the preferred configurations of the capsule, the collecting cavity is placed below the peripheral outlet region.

More preferably, the upper and bottom walls have a substantially circular surface. Therefore, the capsule is a member having a form of revolution of central axis which can be inserted in a beverage preparation device for being centrifuged along its axis.

The upper surface can be a puncturable membrane. The lower surface can be the bottom part of a cup-shaped body which also comprises the sidewall and a flange-like rim onto which is sealed the puncturable membrane. The cup-shaped body is preferably made of plastic and/or aluminium materials.

Preferably, the enclosure is partially filled with a substance for enabling the substance to move against a peripheral wall of the capsule during the centrifugation process. The free volume in the enclosure of the capsule is preferably at least partially filled by a protective gas to preserve the freshness of the substance. A suitable protective gas is nitrogen for example. The free volume can also be partially occupied by a gas coming from the substance after degassing of the substance in the capsule. Such gas for ground coffee can be carbon dioxide.

Preferably, the capsule comprises an internal filter portion placed at the periphery of the enclosure. The internal filter portion can be an internal perforated lid and/or a portion of porous material. The cup-shaped body and internal lid can delimit the enclosure of the capsule. The perforated lid has preferably a peripheral portion of wall comprising a plurality of radial slots. The band of porous material can be placed distant from the upper wall inside the capsule. For instance, the perforated portion of lid or porous portion can be placed a few millimetres, e.g., 1-5 mm, away from the upper wall. It can be placed parallel to the upper wall or inclined (e.g. at 90 degrees) with respect to said upper wall. The said portion is not parallel to the widening sidewall but forms an angle with the sidewall of more than 15 degrees, preferably more than 45 degrees. In another mode, the filter could be part of the device or be formed by the puncturable membrane and piercing members.

The capsule can also comprise a collecting recess forming an annular portion below the puncturable membrane. The collecting recess is positioned to collect the centrifuged liquid passing through the filter portion. The collecting recess can be a few millimetres deep, e.g., 1-5 mm and a few millimetres wide, 1-5 mm. The recess also provides a space for enabling outlet piercing elements of the beverage production device to be properly lodged in the capsule.

In a possible mode, the capsule comprises a central tubular portion extending from the upper lid toward the bottom of the enclosure for guiding water in the capsule. More preferably, the central tubular portion has a section which increases toward the bottom for enabling water to force water to move toward the enclosure by centrifugation.

In another aspect, the invention relates to a single-use capsule for preparing a food liquid from a food substance contained in the capsule by introducing water in the capsule and passing water through the substance using the centrifugal forces for producing the food liquid which is centrifuged peripherally in the capsule relatively to a central axis of the capsule corresponding to an axis of rotation during the centrifugation, comprising:
- an upper wall and a bottom wall,
- a widening side wall connecting to the upper and lower walls and,
- an enclosure containing a predetermined amount of a food substance,
- wherein the upper wall comprises a dedicated peripheral outlet region which is perforable for providing outlets for the release of the liquid.

In a possible alternative of capsule, the invention relates to a capsule for preparing a food liquid from a food substance contained in the capsule by introducing water in the capsule and passing water through the substance using the centrifugal forces for producing the food liquid which is centrifuged peripherally in the capsule relatively to a central axis of the capsule corresponding to an axis of rotation during the centrifugation, comprising:
- an upper wall and a bottom wall,
- a side wall connecting to the upper and lower walls and,
- an enclosure containing a predetermined amount of a food substance,
- wherein the side wall is cylindrical and,
- wherein at a least a portion of the side wall forms the outlet side of the capsule for releasing the centrifuged liquid,
- wherein the capsule also comprises means for sealing it in a gastight manner.

In one characteristic of the capsule, the cylindrical side wall is solid and is intended to be pierced by external piercing means. In this case, the upper wall, lower wall and side wall are connected in a gastight manner.

In another alternative, the cylindrical side wall has outlet openings provided at intervals along its perimeter and a sealing means, e.g., a membrane, which covers the openings in a gastight manner. The outlet openings are preferably provided at about the transversal median plane of the sidewall.

The capsule may comprise a filter means to filter the centrifuged before the liquid is released from the outlets at the sidewall.

The term "cylindrical" is intended to cover a sidewall of tubular circular section, forming an angle of 90 degrees, with a tolerance of + or −5 degrees, relative to the upper wall of the capsule.

In another possible embodiment, the invention relates to a capsule for preparing a food liquid from a food substance contained in the capsule by introducing water in the capsule and passing water through the substance using the centrifugal forces for producing the food liquid which is centrifuged peripherally in the capsule relatively to a central axis of the capsule corresponding to an axis of rotation during the centrifugation, comprising:
- an upper wall and a bottom wall,
- a side wall connecting to the upper and lower walls and,
- an enclosure containing a predetermined amount of a food substance,
- wherein the side wall has a convex cross section which increases from its junction to the upper and lower walls towards a transversal centre plane of the capsule and,
- wherein at least a portion of the side wall forms the outlet region of the capsule for releasing the centrifuged liquid.

In a particular design, the side wall is formed of two truncated portions of walls, wherein the larger sections of the truncated portions connect together towards the median transversal plane of the capsule.

In another particular design, the sidewall is formed of a substantially curved convex cross-section such as, for example, a parabolic, ovoid or semi-circular section.

In another particular design, the side wall is formed of a stepped cross section.

In such embodiments, the outlet region of the capsule is preferably provided in the area of the vertex of the convex cross section of the sidewall.

The angle formed by each truncated portion relative to the upper or lower wall it connects to, is preferably lower than 85 degrees.

The capsule may comprise a filter means to filter the centrifuged before the liquid is released from the outlets at the sidewall. Preferably, the filter is distant from the sidewall along the median transversal plane inside the capsule. The filter can be a cylindrical filter extending from the upper wall to the lower wall.

In another possible embodiment, the invention relates to a capsule for preparing a food liquid from a food substance contained in the capsule by introducing water in the capsule and passing water through the substance using the centrifugal forces for producing the food liquid which is centrifuged peripherally in the capsule relatively to a central axis of the capsule corresponding to an axis of rotation during the centrifugation, comprising:
- an upper wall and a bottom wall,
- a side wall connecting to the upper and lower walls and,
- an enclosure containing a predetermined amount of a food substance,
- wherein the capsule comprises two enclosing members connected at a sealed rim,
- wherein the sealed rim is configured to open under the effect of pressure of a fluid at the interface of the two members.

An advantage is that a closed capsule can be opened without intervention of the user. Another advantage is that opening can be delayed thus improving the interaction between the substance, e.g., ground coffee, and water in the capsule. The capsule can also be sealed in a gastight manner and include a protective gas to improve freshness of the substance in the capsule.

In particular, the two enclosing members may be two half shelves which are sealed along a transversal median plane. Hence, the capsule can be symmetrical relative to the median plane and it can so be used in two possible orientations. In that respect, it can be noted that the terms "upper" and "lower" are used for practical descriptive reasons but they do not narrow the scope of the protection.

The two members can be flexible foils which are heat or ultrasonically sealed at a flange-like rim. Thus, the sealed rim can break or delaminate by the pressure of liquid that is centrifuged in direction of said rim. The opening by the liquid under pressure enables to control the residence time of the liquid in the capsule and hence improves the interaction of water and substance in the capsule. The time delay may depend on the sealing material at the sealed rim but it also depends on the operational parameters (i.e., rotational speed, water quantity) of the system.

It should be noted that the sealed rim could also be opened by a fluid under pressure which is not the liquid such as by a gas under pressure. A flushing of gas may be provided before the centrifugal operation to open the outlets.

The invention relates to a method for preparing a food liquid from a food substance contained in the capsule by introducing water in the capsule and passing water through the substance using the centrifugal forces for producing the food liquid which is centrifuged peripherally in the capsule relatively to a central axis of the capsule corresponding to an axis of rotation during the centrifugation, wherein the capsule comprises two enclosing members connected at a sealed rim, wherein the capsule is inserted in a centrifuging beverage preparation device and, wherein the sealed rim of the capsule is opened under the effect of the pressure of a fluid at the interface of the two members.

According to the method, the pressure of fluid is the centrifuged liquid.

According to the method, the sealed rim is broken and/or delaminated for creating outlet(s) for the release of the liquid.

The sealed rim may be opened to form discrete outlets or, on the contrary, a continuous peripheral slot.

The opening of the outlets is preferably controlled by engaging surfaces of the beverage preparation device which are distanced from the rim by a controlled gap.

The term "food liquid" has here a broad meaning and encompasses: a culinary liquid such as soup or sauce, a beverage liquid such as coffee extract (obtained from ground and/or instant coffee powder), liquid chocolate, milk (obtained from powder and/or liquid concentrate), tea extract (obtained from instant and/or leaf), etc., or a nutritional liquid such as an infant formula and combinations thereof.

The capsule of the invention provides many advantages over the "open" centrifugal systems of the prior art, in particular:

A higher quality of the delivered liquid obtained by the protection of the substance in the capsule, A more consistent quality of the delivered liquid, Surprisingly, a better crema for coffee (more stable), More beverage variety by the possibility to tailor the capsule technology to the nature of the liquid to be delivered and/or substance in the capsule, A more convenience operation, A cleaner operation.

The terms "brewing" or "brewed" is not to be taken in the narrow sense of extracting under pressure a liquid from a non-entirely soluble substance (such as ground coffee or leaf tea) but is to be taken in a broader sense as encompassing the interaction processes of a food substance and a liquid, preferably water, including the processes of extraction, infusion, adsorption, dissolution, dilution, dispersion, mixing, emulsifying, foaming and the like.

The term "piercing" is to be taken in its broad sense and it includes the mechanical and/or thermal processing for providing a through-opening in a wall of the capsule.

The "extraction yield" reflects the extraction efficiency and is defined as the weight of total solids in the liquid extract divided by the total weight of starting coffee ingredients in the capsule (e.g., roast and ground coffee). This value is typically expressed in percentage.

The average particle size "$D_{4,3}$" represents the mean volumetric diameter of the coffee grind as obtained by laser diffraction method using a Malvern® optical instrument and butanol as dispersing agent for the particles.

BRIEF DESCRIPTION OF THE DRAWINGS

Additional features of the invention will appear in the detailed description of the figures which follows.

DETAILED DESCRIPTION OF THE INVENTION

Figure 1:
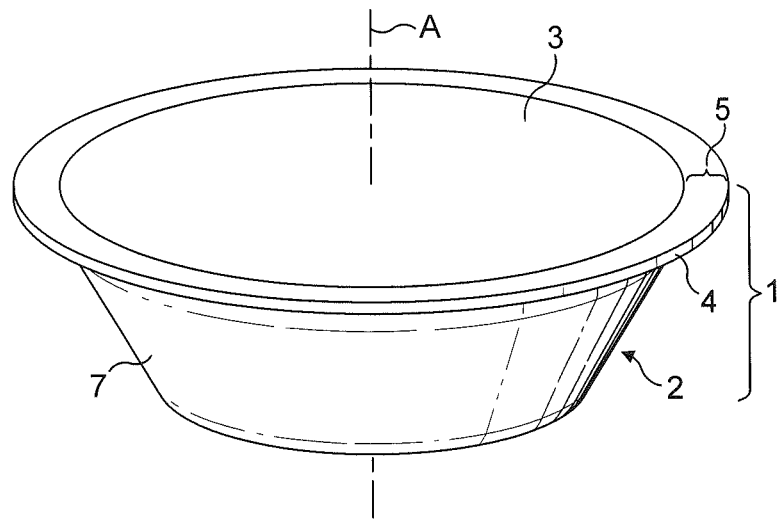
FIG. 1 is a perspective view from above of a capsule of the invention.
Figure 2:
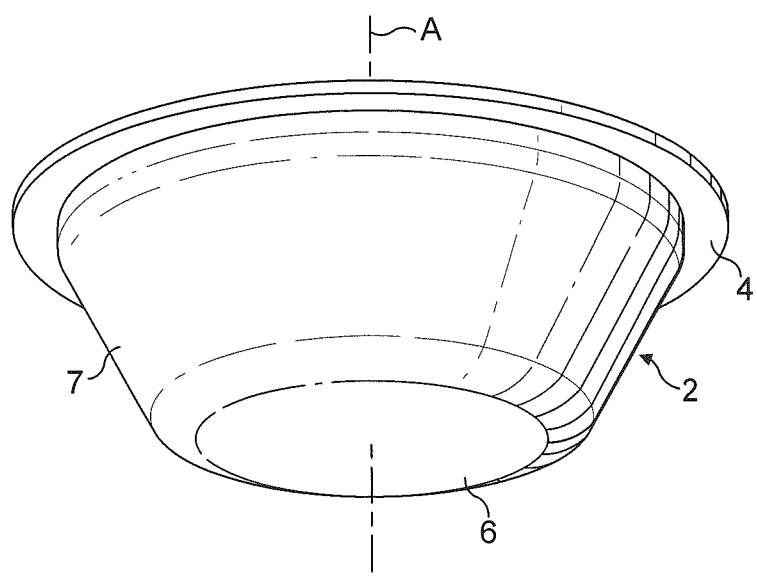
FIG. 2 is a perspective view from below of the capsule of the invention.
Figure 3:
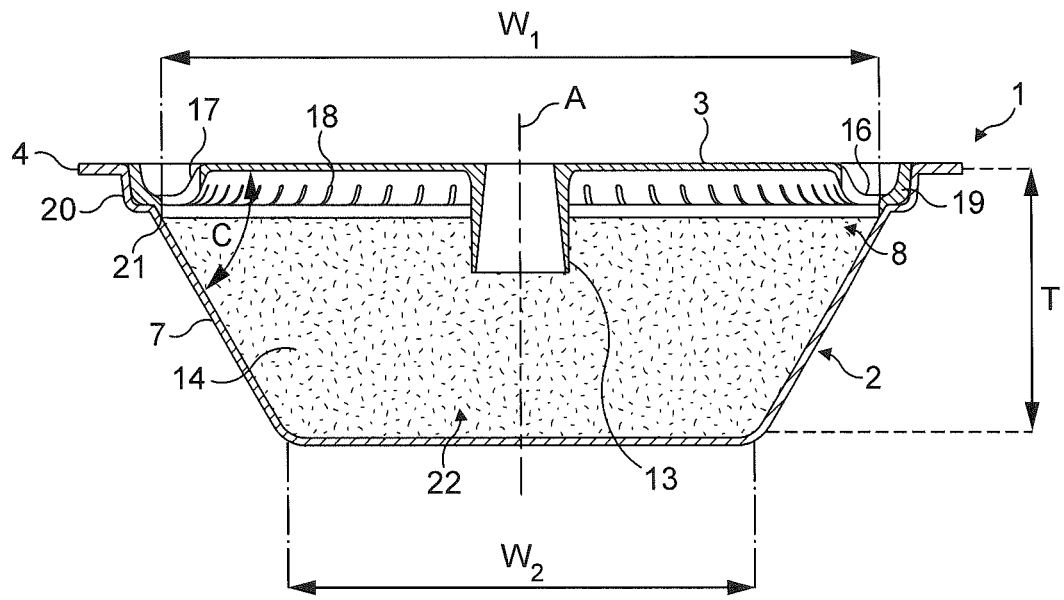
FIG. 3 is perspective view of the capsule with the sealing foil removed.
Figure 4:
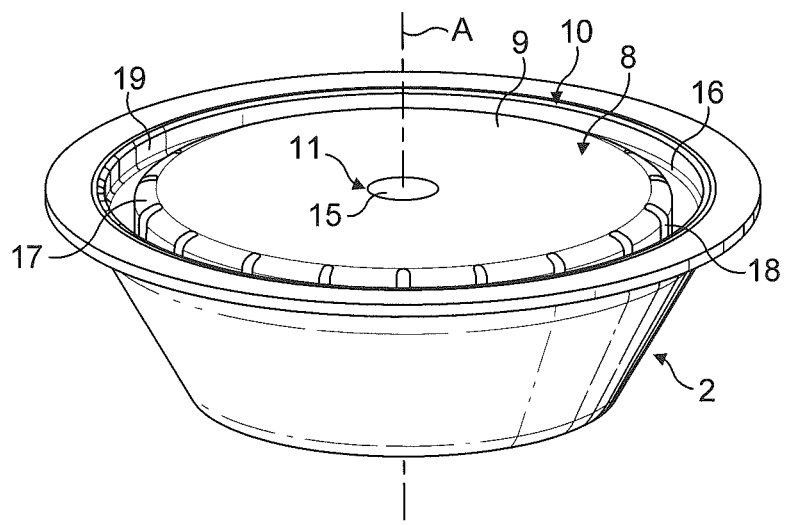
FIG. 4 is a cross section view of the capsule of the invention.

As shown in FIGS. 1 and 2, a preferred capsule 1 of the invention generally comprises a dished body 2 onto which is sealed a sealing foil 3. The sealing foil 3 is sealed onto a peripheral rim 4 of the body at a sealing annular portion 5. The rim 4 can extend outwards forming a small annular portion, e.g., of about 2-5 mm. The dished body comprises a bottom wall 6 and a side wall 7 which preferably widens in direction of the large open end of the body opposed to the bottom wall. The dished body is preferably rigid or semi-rigid. It can be formed of a food grade plastics, e.g., polypropylene, with a gas barrier layer such as EVOH and the like or aluminium alloy or a complex of plastic and aluminium alloy. The sealing foil 3 can be made of a thinner material such as a plastic laminate also including a barrier layer or aluminium alloy or a combination of plastic and aluminium alloy. The sealing foil is usually of a thickness between 30 and 250 microns, for example. The sealing foil member can be pierced for creating the water inlet and the beverage outlet(s) as will be described later in the description.

Figure 5:
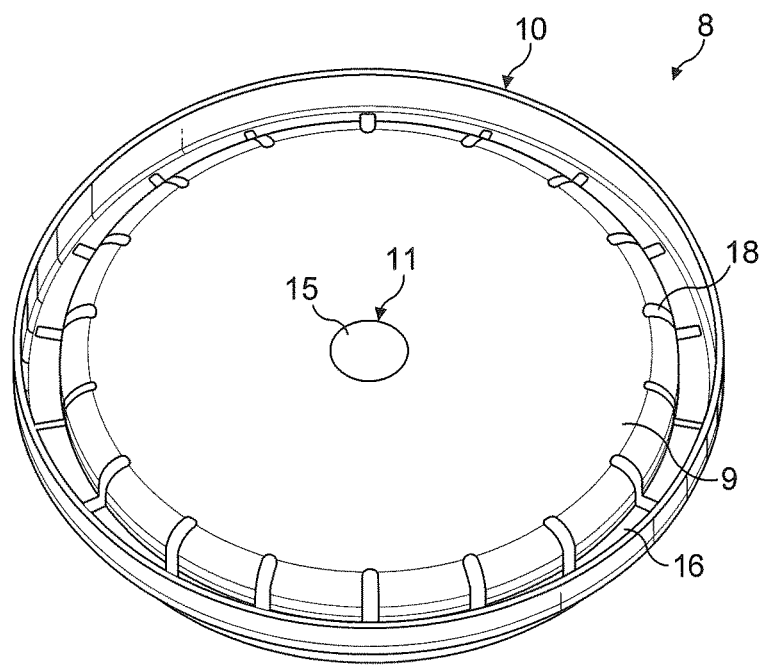
FIG. 5 is a perspective view of the lid from above of the capsule of the invention.
Figure 6:
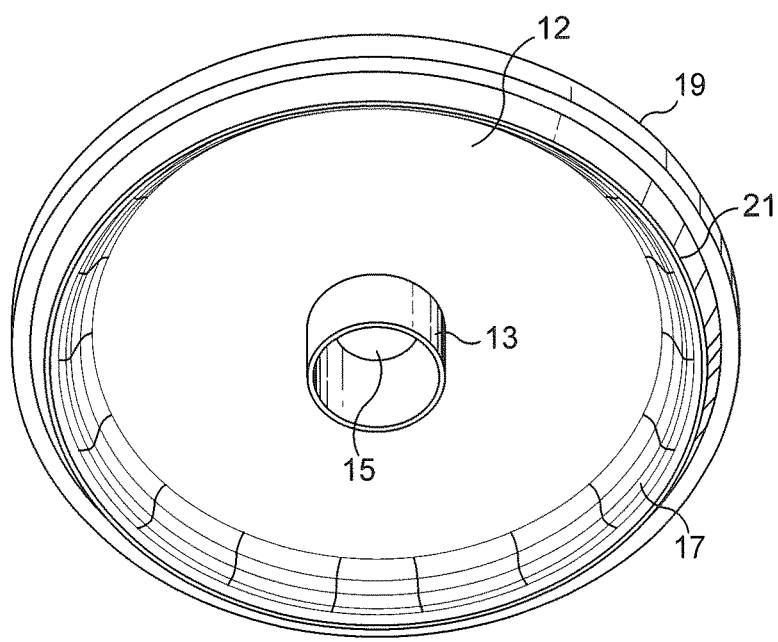
FIG. 6 is a perspective view of the lid from below of the capsule of FIG. 4.

In relation to the embodiment of FIGS. 3 to 6, the capsule of the invention comprises an inner member forming a lid 8 which is inserted in the dished body. The lid 8 and body 2 delimit together an internal enclosure 14 for receiving the food substance 22. Preferably, the capsule forms a symmetry of revolution around a central axis A. However, it should be noted that the capsule may not necessarily have a circular section around axis A but may take another form such as a square or a polygonal form. The lid 8 is illustrated in FIGS. 5 and 6. The lid can take the form of a disc of plastic comprising a central portion 9 and a peripheral portion 10. The central portion can be substantially flat and may comprise a inlet port 11 for enabling the introduction of a water injection member of the beverage production device. In the internal side 12 of the lid, the inlet port can extend by a tubular inlet portion 13 which serves for ensuring the water is guided toward the direction of the bottom of the body to ensure complete wetting of the substance in the enclosure and so reduced risk of leaving for example "dry powder spots". Preferably, the inlet port is closed by a breakable or puncturable closure part 15. This part serves to prevent substance of the enclosure from filling the interstice between the upper surface of the lid and the sealing foil. The lid further comprises a peripheral portion 10 including a collecting recess 16. The collecting recess forms a U-shape in transversal section (FIG. 3) which opens in the direction of the sealing foil. The recess is preferably continuously extending at the periphery of the lid although it can be replaced by several discontinuous recessed portions which may be separated by reinforcing elements or walls, for example. The collecting recess comprises an inner peripheral portion of wall 17 into which is provided a series of outlet openings 18 forming a fluid communication between the enclosure 14 and the collecting recess 16.

Preferably, the capsule is dimensioned so that it provides an optimal receptacle into which liquid can centrifuge from the central axis towards the peripheral portion 17. In particular, the upper wall formed by the sealing membrane 3 has a width "$W_1$" which is greater than the width "$W_2$" of the bottom wall 6 of the capsule. For example, $W_1$ is comprised between 1.2 and 2 times the width $W_2$, most preferably, 1.3 and 1.8 times $W_2$. The distance "T" between the upper wall and the bottom wall is also preferably comprised between 0.15 and 1.0 times $W_1$. For instance, the enclosure of the capsule has upper wall of W1 (diameter) between 50 and 120 mm, a lower wall of W2 (diameter) between 30 and 80 mm and a thickness "T" of between 10-50 mm. The angle "C" of the widening side wall is preferably lower than 80 degrees relative to the upper wall, preferably comprised between 50 and 70 degrees.

The outlet openings also form a restriction in the flow of the centrifuged liquid in the enclosure. The centrifuged liquid is forced to pass the openings which can be sized as a function of the type of beverage to be produced. For instance, for espresso or ristretto coffee extract, it can be advantageous to provide smaller openings than for lungo or "Americano" coffee extract. For a same rotational speed, smaller openings create a higher resistance to the centrifuged liquid which remains longer in the capsule. As a consequence, the interaction between water and the coffee particles is higher and liquid can charge more in coffee solids.

As illustrated in this example, the openings may be slots or holes which are distributed at intervals in the inner peripheral portion of wall 17. For example, the number of slots can range of from 5 to 200, preferably of from 10 to 100. These slots have preferably a width that is smaller than the statistical average size of the particles of the substance. For example, the slots have a width of less than 500 microns, preferably lower than 400 microns, most preferably between 50 and 200 microns, for a substance which is ground coffee. The slots may extend if necessary on the central portion 9 or in the bottom of the recess 16. The slots can be replaced by holes of circular section having a diameter smaller than the statistical average size of the particles of the substance.

Figure 13:
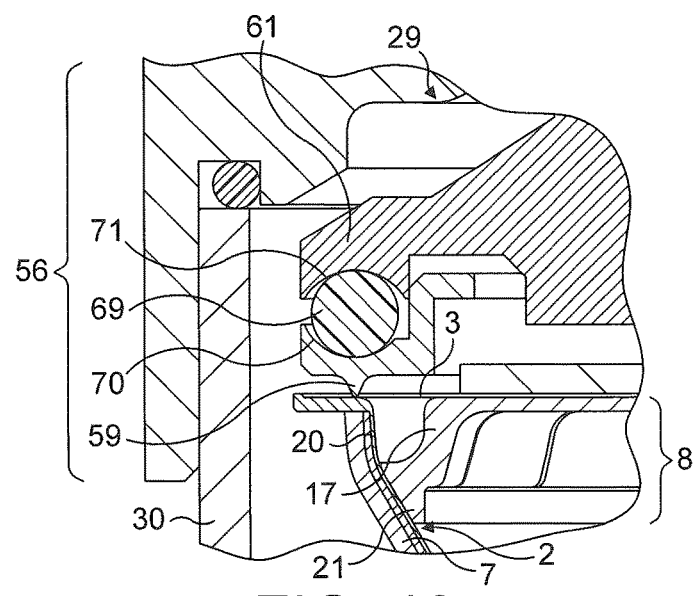
FIG. 13 is a detail view of the module of FIG. 12.

The collecting recess 16 forms a peripheral annular groove of small depth, e.g., between 2 and 10 mm to allow the introduction of piercing members through the sealing foil to produce outlets for the brewed liquid which is produced in the capsule as will explained later in the description. The collecting recess is open upwardly toward the sealing membrane which seals it. The collecting recess 16 further comprises an outer peripheral portion 19 forming an edge bearing onto a seat portion 20 of the dished body. The outer portion 19 can be engaged in the seat portion 20 by a more or less tight fit engagement. An additional sealing portion 21 extending along the internal surface of the side wall of the body and in the direction of the bottom of the dished body can extend from the recess to create further sealing against possible ingress of liquid between the lid and the inner surface of the body of the capsule. Of course, the form of the collecting recessed means can take different configurations without departing from the scope of the invention. For example, the recess 16 can be formed by the lid 8 and the side wall 7 of the dished body (as illustrated in FIG. 13). In this case, the outer peripheral portion 19 can be omitted.

As illustrated in the figures, the series of outlet openings, e.g., slots 18, are preferably placed at or close to the widening part of the enclosure relative to the central axis A. Therefore, the centrifuged liquid will tend to be guided along the inner surface of the side wall of the body, up to the inner side 12 of the lid, and then through the slots. The lid 8 is fully closed by the sealing foil 3 when it is sealed onto the rim of the dished body. In a possible alternative, the sealing foil could cover only the collecting recess including the region of the slots.

It should be noticed that the lid 8 can be a rigid or semi-rigid member made of thermoformed or injected plastic for instance. However, this part could also be made of a flexible membrane which is sealed to the inner surface of the dished body without departing from the scope of the invention.

It can also be noticed that a filter wall can also be placed inside the enclosure against the inside surface 12 of the lid. A filter wall can provide an improved filtration, for example, for substance of very thin particle size and/or for delaying the release of the centrifuged liquid out of the enclosure by creating a higher pressure drop. A filter wall can be a paper filter or thin plastic film which is glued onto the surface 12 of the lid. The lid can be simply inserted in the dished shaped body or be fixed by any suitable connection means such as by ultrasonic welding.

Figure 7:
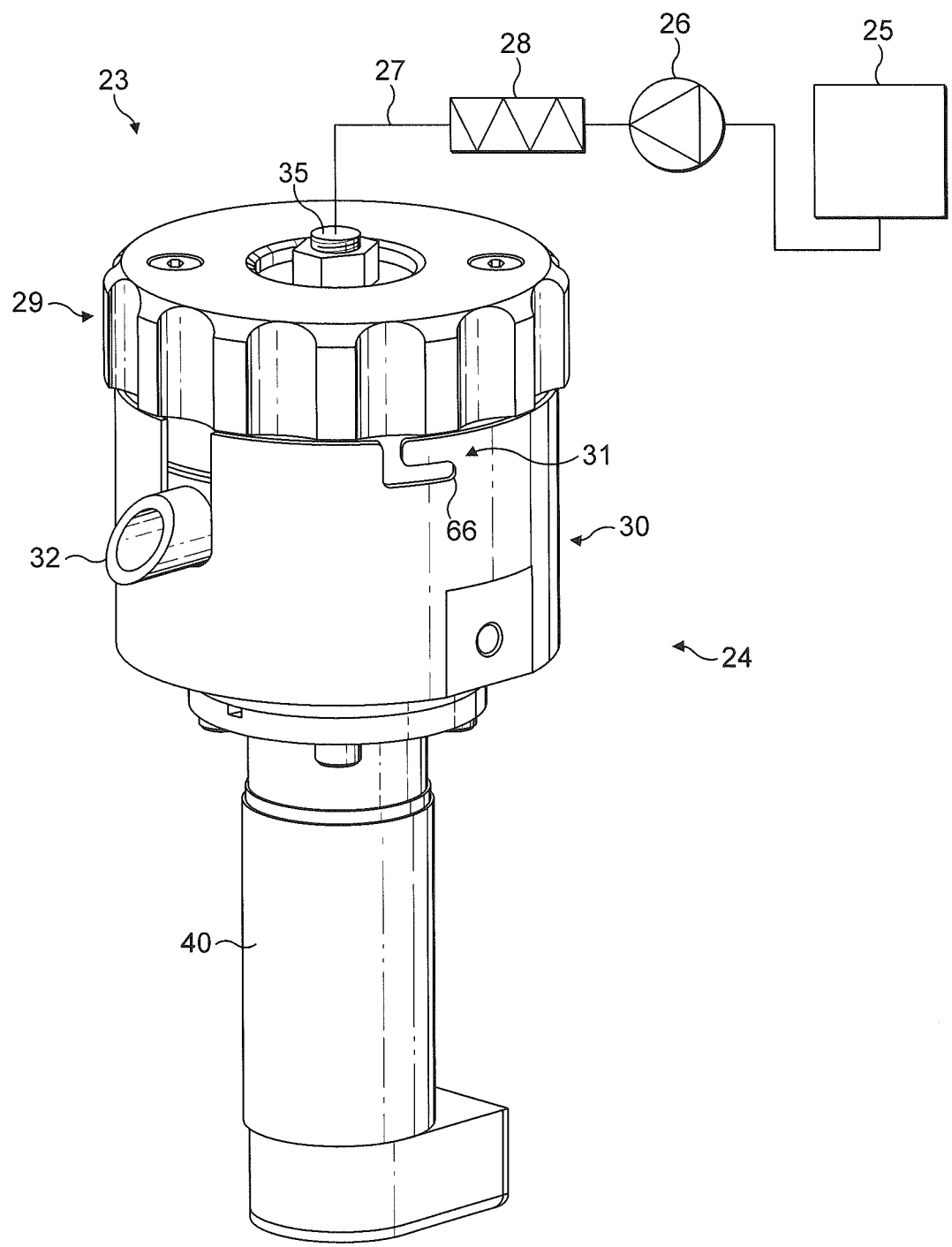
FIG. 7 is a perspective view of the beverage production device of the invention.
Figure 8:
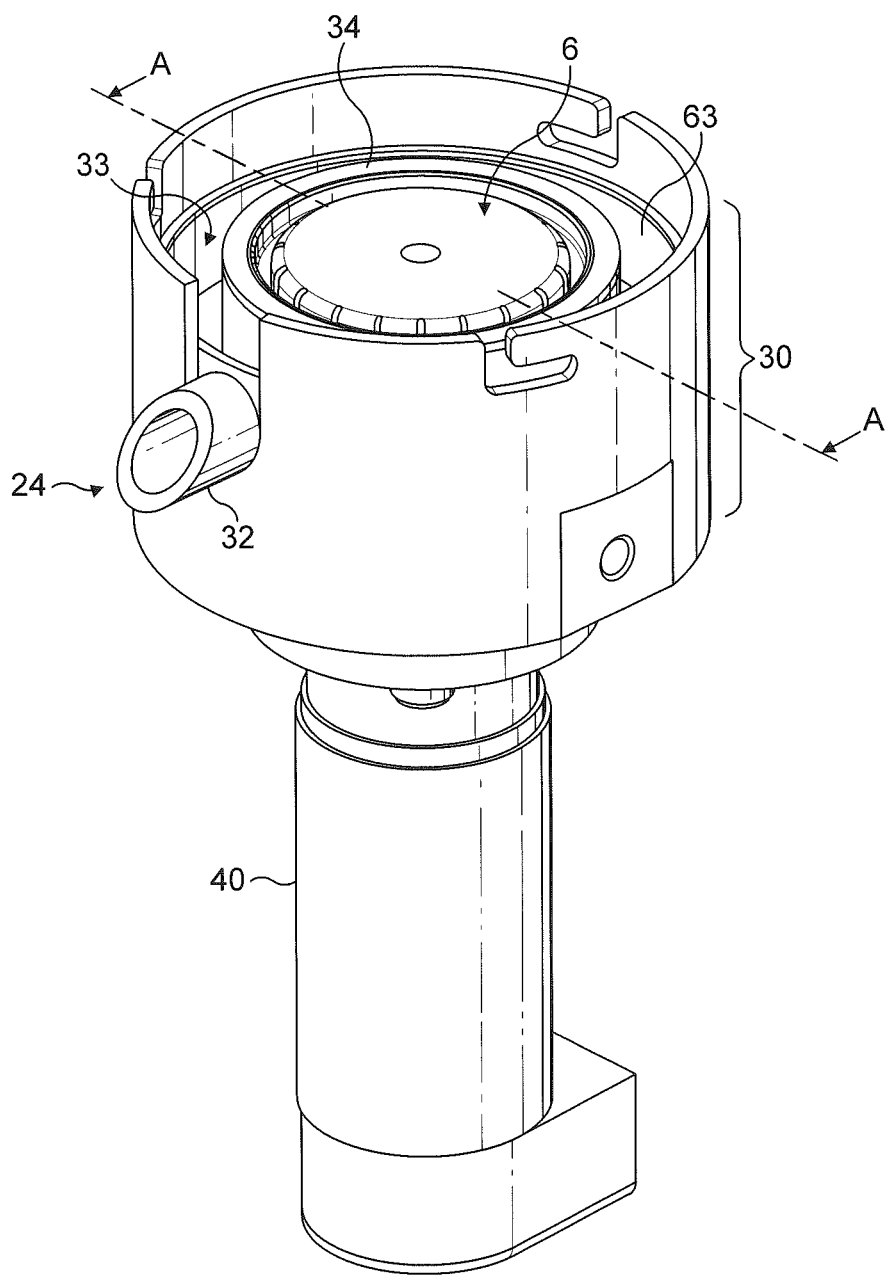
FIG. 8 is a perspective view of the beverage production module in open mode.

The system including a capsule of the invention and a beverage preparation device is illustrated in FIGS. 7 and 8 and described now.

Thus, the system comprises a capsule 1 as aforementioned and a beverage preparation device 23. The device has a module 24 into which a capsule can be inserted. The capsule contains a food substance for being brewed and the capsule is removed from the module after use for being discarded (e.g., for waste or recycling of the organic and inorganic raw materials). The module 24 is in fluid communication with a water supply such as a water reservoir 25. A fluid transport means such as a pump 26 is provided in the fluid circuit 27 between the module and the water supply. A water heater 28 is further provided to heat water in the fluid circuit before water enters the module. The water heater can be inserted in the fluid circuit to heat fresh water coming from the reservoir or alternatively can be in the water reservoir that becomes a water boiler in such case. Of course, water can also be taken directly from a domestic water supply via a water plug connection.

Water can be fed in the beverage preparation module 24 at low pressure or even at gravity pressure. For example, a pressure of between 0 and 2 bar above atmospheric pressure can be envisaged at the water inlet of the module. For instance, the water pump can deliver a water pressure and flow rate sufficient to provide a continuous water flow (i.e., without flow shortage due to the centrifuge pumping effect in the capsule) at the operational centrifugal speeds during centrifugation. Water at higher pressure than 2 bar could also be delivered if a pressure pump is utilized such a piston pump.

The brewing module 24 can comprise two main capsule encasing sub-assemblies 29, 30; mainly comprising a water injection sub-assembly or water injection head and a liquid receiving subassembly including a capsule holder. The two subassemblies form positioning and centering means for the capsule in the device.

The two assemblies' closes together to encase a capsule therein for example by a bayonet-type connection system 31. The liquid receiving subassembly 30 comprises a liquid duct 32, for example, protruding on a side of the subassembly for guiding the centrifuged liquid coming out of the capsule to a service receptacle such as a cup or glass. The liquid duct is in communication with a liquid receiver 33 forming an annular U- or V-shaped cavity 63 placed about a capsule holder formed by a rotating drum 34 into which the capsule is inserted as illustrated in FIG. 8. The liquid receiver defines with the drum an intermediate cavity 63 for collecting the liquid as will be explained later in the description. Below the liquid receiving subassembly 30, are placed means for driving the capsule receiving drum 34 in rotation inside the subassembly.

The driving means comprise preferably a rotary motor 40 which can be supplied by electricity or gas power.

The water injection subassembly comprises a water inlet side comprising a water inlet 35 communicating upstream with the water fluid circuit 27.

Figure 9:
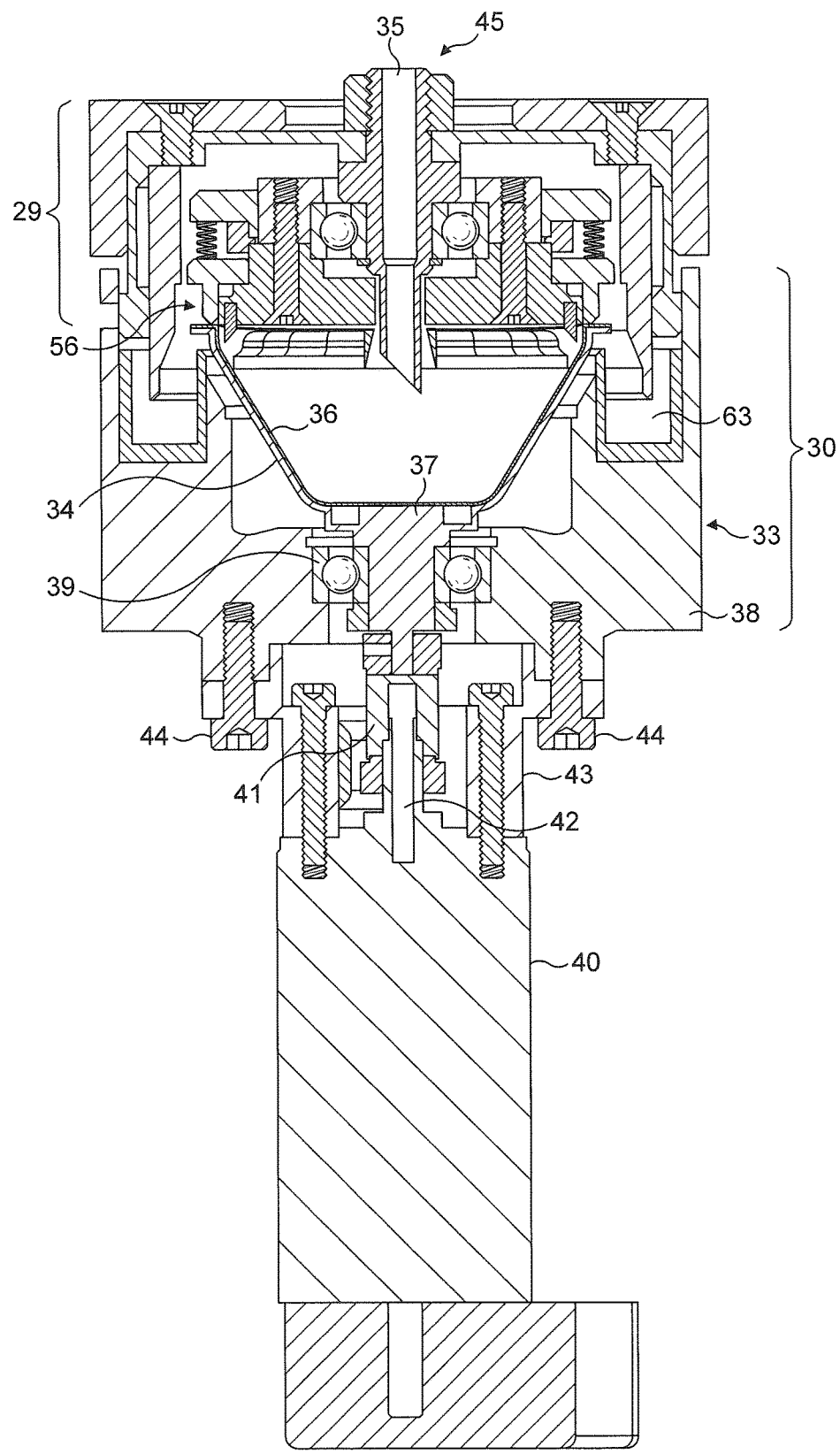
FIG. 9 is a cross-sectional view along line A-A of the beverage production module in a closed mode about the capsule.
Figure 10:
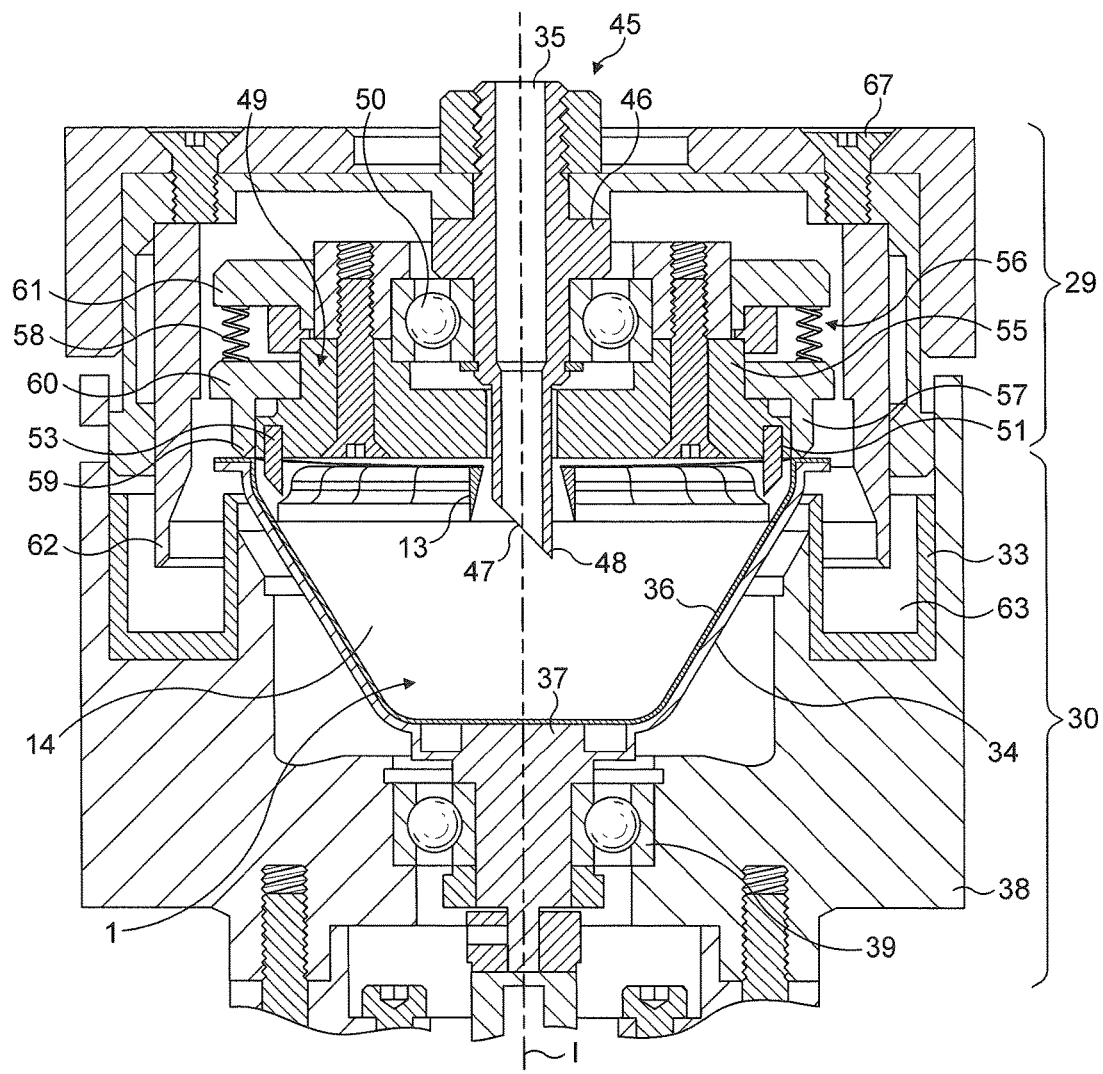
FIG. 10 is an enlarged view of the view of FIG. 9.

In relation to FIGS. 9 and 10, the rotary drum 34 is shaped as a hollow capsule holder with an internal cavity 36 complementary shaped to receive the capsule. The rotary drum 34 prolongs itself axially by a rotating shaft 37 which is maintained in rotational relationship relative to an outer base 38 of the liquid receiver 33 by a rotational guiding means 39 like a ball bearing or needle bearing. Therefore, the rotary drum is designed to rotate around a median axis I whereas the outer base 38 of the receiver is fixed relative to the device. The liquid receiver 33 can be fixed to a housing 43 of the motor by bolts 44 for example. A mechanical coupling 41 is placed at the interface between the rotating shaft 37 of the drum and the shaft 42 of the motor 40.

Figure 11:
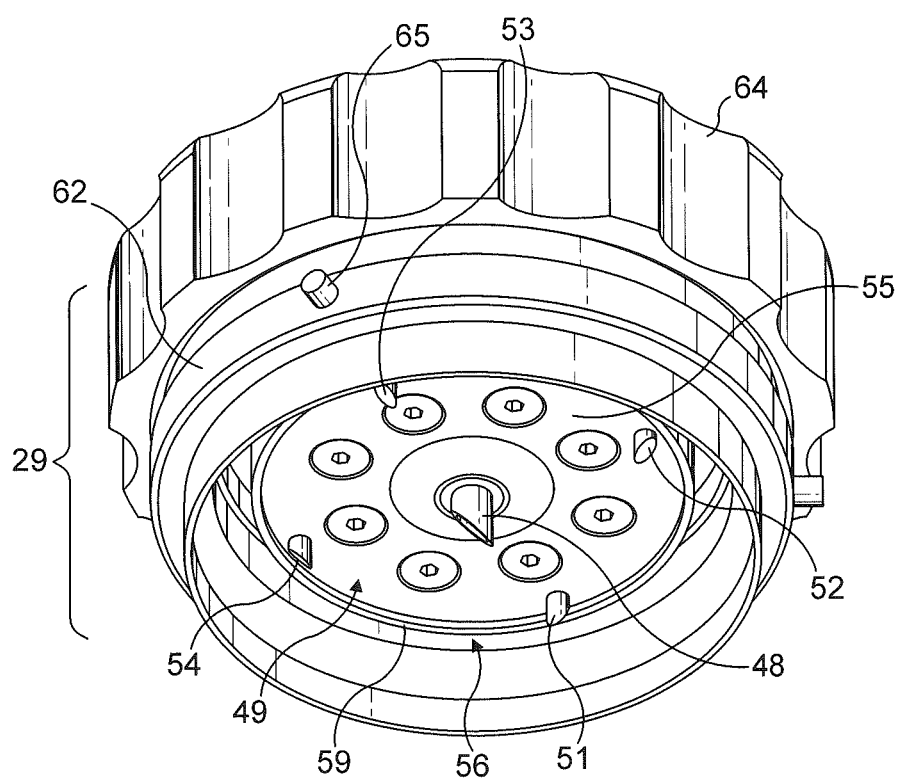
FIG. 11 is a view of the water injection assembly of the module of FIGS. 9 and 10.

Considering the water injection subassembly 29, as illustrated in FIGS. 10 and 11, it comprises a centrally arranged water injector 45 which is fixed relative to longitudinal axis I of the device. The water injector comprises a central tubular member 46 for transporting water from the inlet 35 to a water outlet 47 that is intended to protrude inside the enclosure 14 of the capsule. The water outlet is formed of a puncturing means 48 such as a sharp tubular tip that is able to create a puncture hole through the closing foil of the capsule and through the eventual breakable part of the tubular inlet 13 of the lid.

About the water injector is mounted a capsule rotary engaging part 49. The engaging part 49 has a central bore for receiving the water injector and rotational guiding means such as a ball or needle bearing 50 inserted between the part 49 and the injector 45. The engaging part further comprises outlet piercing members 51, 52, 53, 54 protruding from a disc-shaped engaging wall 55 of the part 49. The piercing members can be small cylindrical portions with a slanted cutting surface able to cut or perforate small holes in the sealing foil 3 of the capsule. The piercing members are arranged at the periphery of the wall 55, preferably evenly distributed to provide several openings in the capsule for the centrifuged liquid to leave the capsule forming several streams of liquid. Of course, it is possible to have the water injector 45 be a rotary element in conjunction with the capsule. In such case, the water injector can be fixed to the rotary part 49 and the two parts can rotate together along axis I.

According to one aspect of the invention, the water injection subassembly 29 further comprises a valve system 56 for controlling the flow of liquid that is discharged from the device. The valve system 56 can be arranged on the capsule rotary engaging part 49 in the form of an annular engaging portion 57 which is biased under the force of elastic loading means 58 such as springs. The annular engaging portion 57 includes a pressing peripheral surface 59 which applies a closing force on the peripheral rim 4 of the capsule to be able to restrict the flow of liquid under the force of the elastic loading means. The surface 59 can form a cone or "V" for increasing the sealing pressure in a localized area. The engaging portion 57 further comprise an internal base portion 60. The elastic loading means 58 is thus inserted in a space located between the base portion 60 and a counter-force portion 61 of the engaging part 49. Therefore, at a rest position, the engaging portion 57 of the valve system keeps closing on the rim of the capsule under the compressive effect of the resilient means 58.

The capsule engaging subassembly 29 may further comprise a tubular portion of skirt 62 which protrudes in the internal annular chamber 63 of the liquid receiving subassembly 30 when the two subassemblies are closed relatively one another about a capsule. This tubular portion of skirt 62 forms an impact wall for the centrifuged liquid under pressure that passes through the valve system. This portion 62 is preferably fixed on the subassembly 29. The subassembly further comprises a handling portion 64 for facilitating the connection on the liquid receiving subassembly 30. This handling portion 64 can have a knurled peripheral surface for handling. The handling portion can be fixed on the fixed base of the subassembly 29 by screws 67.

This portion could of course be replaced by a lever mechanism or a similar handling means.

As already mentioned, connection means are provided for the relative connection of the two subassemblies 29, 30. For example, small pins 65 are provided on the side of the tubular surface of the water injection subassembly 29 which can engage side locking openings 66 on the tubular surface of the liquid receiving subassembly 30. Therefore, connection between the two subassemblies can be carried out by a rotational angular or helical closure movement for enabling the pins to engage the oblong openings 66. Of course, other connection means can be envisaged to replace this bayonet-type connection means. For instance, a threading means or a translational closure means can be envisaged by any person skilled in the art.

The capsule system of the invention works basically according to the following principle. The capsule device is opened by moving the two subassemblies 29, 30 relatively one another, e.g., by disconnecting the bayonet-type connection and separating the two subassemblies' 29, 30. As a result, a single-use sealed capsule 1 containing a food substance, such as a dose of roast and ground coffee, can inserted in the device, i.e., placed in the cavity of the rotating drum 36. The capsule can be placed in the device while the capsule being gastight closed by the sealing foil 3. The device is then closed by the subassembly 29 being connected back onto the subassembly 30 and locked by the connection means. In the locked position, the capsule is opened by the water injector that pierces through the sealing foil of the capsule and introducing itself through the water inlet 35 of the capsule. At the same time, several liquid outlets are pierced at the periphery of the sealing foil by the outlet piercing members 51-54. Water can thus be introduced in the capsule via the central water injector 45. Venting holes can be produced in the injection subassemblies to allow gas to escape the capsule while water is introduced in. The capsule can be driven in rotation by activating the rotary motor 40. The start of the centrifugal operation can be carried out at the same time as water injection start being introduced in the capsule or slightly after or before this water injection operation starts. For instance, it might be advantageous for brewing ground coffee, to allow during several seconds that water fills in the capsule before starting the centrifugal operation by rotating the capsule. Thus, water can properly infiltrate in the coffee before, the liquid is centrifuged thereby avoiding coffee area to remain dry in the coffee portion. The centrifugation is carried out by rotating the capsule around the central axis 1 of rotation of the device that is preferably aligned to the central axis A of the capsule. The rotational speed is preferably of from 1000 to 12000 round-per-minutes (rpm), more preferably of from 1500 to 9000 rpm. A control unit can be provided in the device for setting the rotational speed according to the nature of the liquid to be brewed and/or the substance in the capsule. The higher the rotational speed, the higher the pressure is exerted at the peripheral wall of the capsule and the more the substance is compacted on the sidewall of the capsule. It is important to notice that higher rotational speeds promote brewing of coffee extract containing a lower solid content since the residence time of liquid in the coffee bed is shorter. Lower rotational speeds provide coffee of higher strength (coffee solid content) since the residence time of liquid in the capsule is longer. Brewing takes place in the capsule by water traversing the substance thereby providing an extraction or partial or total dispersion or dissolution of the substance. As a result, a centrifuged liquid is allowed to pass through the plurality of outlet openings 18 provided in the capsule, e.g., through the lid 8.

Under the effect of centrifugal forces, the substance, such as coffee powder, tends to compact itself radially against the peripheral walls 7, 17 of the enclosure of the capsule. whereas water is forced to flow through the substance. This results in the substance being both compacted and intimately wetted by water. Due to the high rotational movement of the capsule, the centrifugal forces exert themselves uniformly on the mass of the substance. Consequently, the water distribution is also more uniform compared to usual methods using a pressure pump to provide a water piston through the coffee in the capsule. As a result, there is lower risk of preferential flow path through the substance which could lead to areas which are not properly wetted and so not properly brewed, dispersed or dissolved. With ground coffee powder, the liquid that reaches the internal sidewall of the capsule is a liquid extract. This liquid extract is then forced to flow upwards along the internal surface of the sidewall of the capsule. The widening of the sidewall 7 of the capsule promotes the upward flow of the liquid in the capsule in direction of the openings.

These outlet openings 18 of the enclosure of the capsule are sized as a function of the substance stored in the capsule. Small openings such as slots of small width or holes of small diameter tend to provide a filtering function to retain the solid particles in the enclosure of the capsule while allowing only the liquid extract to pass the openings. Also as aforementioned, the openings may also provide a flow restriction that impacts on the interaction of water with the substance and on the creation of foam or crema on the top of the beverage. These holes also form sufficient restrictions that create shear forces and consequently generate foam or coffee crema. Some gas contained in the capsule can become entrapped in the liquid and forms, due to the pressure release after the flow restriction, a multitude of small bubbles in the liquid.

Also, the valve system 56 of the device can start opening as pressure of liquid increases on the valve when liquid leaves the capsule. Therefore, a certain time delay before opening can be controlled by the valve system to enable sufficient interaction between water and the substance contained in the capsule. This controlled delay depends on various parameters such as the centrifugal speed, the force exerted by the elastic loading means (i.e., spring stiffness), the pressure drop as created by the substance and outlet openings, etc. The opening of the valve system occurs by the pressing surface 59 of the valve system lifting as pressure of liquid increases on its internal surface. It can be noted that the capsule of the rim can also be substantially flexible to flex under the effect of the pressure of liquid. Therefore, the relative movement between the pressing surface and the capsule create a small annular passage for the liquid to escape out of the small interstice upstream of the valve system. At relatively high rotational speeds, a peripheral jet of liquid can be formed that impacts on the internal surface of the portion of skirt 62. The liquid starts to fill the cavity 68 of the liquid receiving subassembly and liquid can drain through the liquid duct 32 to be collected in a cup or glass placed underneath.

Figure 12:
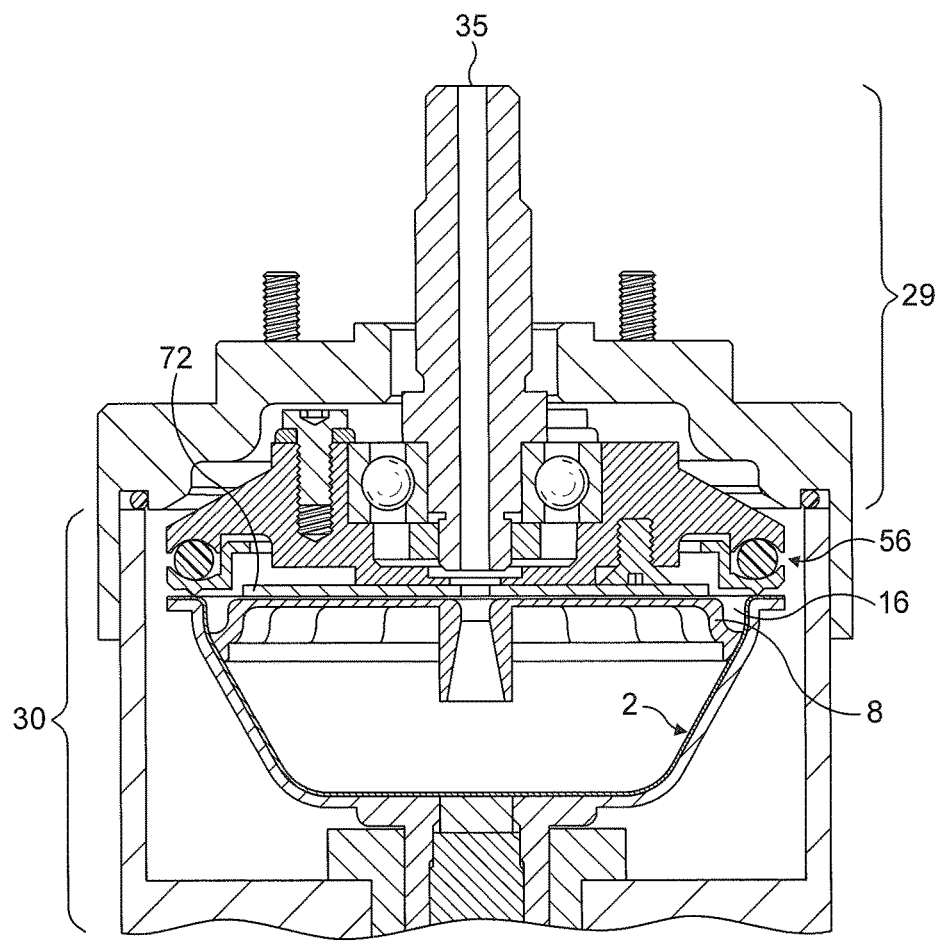
FIG. 12 is a cross sectional view of a beverage production module similar to FIG. 9 but for another embodiment of the invention.
Figure 14:
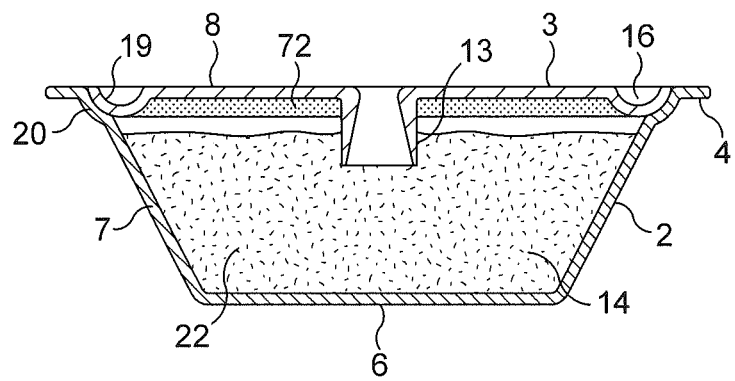
FIG. 14 is a cross section view of a variant of the capsule of the invention.
Figure 15:
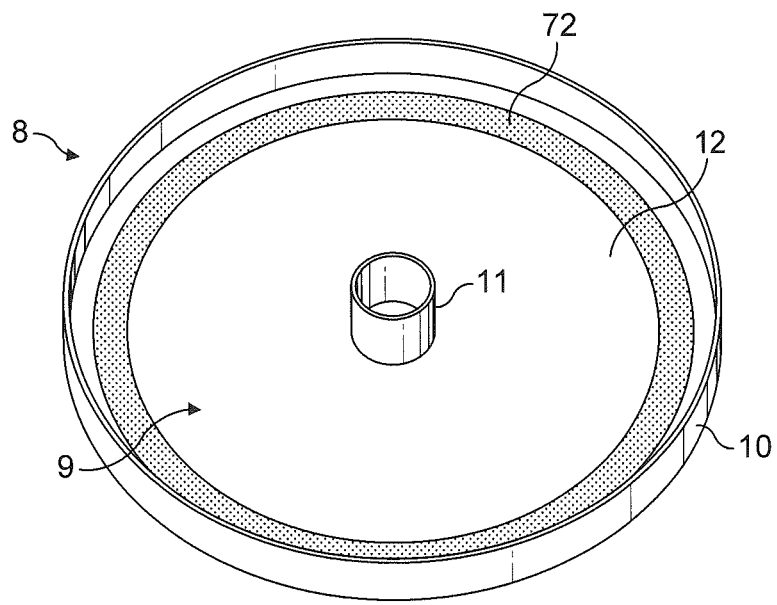
FIG. 15 is a view from underside of the lid of the capsule of FIG. 14.

In another mode of the invention illustrated in FIGS. 12 and 13, the same numeral references have been taken to identify the same or equivalent technical means. In this mode, the valve system 56 differs in that the elastic loading means is obtained by a rubber elastic O-ring 69 inserting between a lower member comprising a pinching surface 59 and an upper fixed portion 61 of the water injection subassembly 29. The O-ring is maintained in place between two concave surfaces 70, 71 of the valve system. Again during brewing, the pressure of liquid in the capsule tends to lift the pinching surface 59 to create an annular passage between the rim 4 of the capsule and the pinching surface. The pinching surface can be shaped with a sharp tip or edge that can create a concentration of the pinching forces onto the rim. Of course, it could be imagined that the elastic loading means 69 and the pinching member are the same element. For example, the pinching member can be made of rubber-elastic material. In the mode of FIGS. 12 and 13, the water injector can be a simple water outlet connectable to an inlet of the capsule with no puncture means. In this case, the capsule is pre-opened before it is inserted in the device, i.e., the sealing foil is removed by peeling, or a central hole is perforated before the capsule is inserted in the device. Furthermore, a sealing engagement of the water injector can be performed by a sealing means 72 which applies a certain sealing pressure on the top surface of the capsule. Therefore, water is prevented from leaking along the top surface of the capsule and from by-passing the capsule to release directly through the liquid outlet. The capsule of the invention can take various embodiments such as the one illustrated in FIGS. 14 and 15. The general structure of the capsule is the same as for the previous embodiment except that the outlet openings are formed by a filter paper, a woven or non-woven filtering portion or another meshed or porous membrane 72. Thus, the lid 8 which is inserted in the dished body 2 comprises a circumferential band of a porous material. The porous material provides restriction of the flow, creating a certain pressure drop, e.g., between 0.5 and 4 bar, and leading to a filtering of the solid particles. In particular, the size of the pores of the material can be chosen to retain also the coffee fines, i.e., the particles of particle size as low as 90 microns. preferably, the porosity is lower than 200 microns, e.g., comprised between 2 and 200 microns. The pressure drop is also obtained when the overall open surface of the porous band is lower than 50% of the total surface area of the surface of the band. The paper, fabric, meshed or porous material can be formed of a band or bands which can be welded or otherwise combined to the lid. The band could have a width of between 0.5 and 2 cm for example. The lid also comprises an annular recess 16 for collecting the centrifuged liquid which travels through the peripheral filter band. A sealing membrane 8 covers the lid and closes the capsule in a gastight manner. The sealing membrane preferably seals onto the flange-like rim 4 of the body of the capsule. The lid can further comprises a central conical portion 13 extending in the enclosure of the capsule to guide water in the capsule. The capsule has ingredients 22 such as ground coffee which at rest occupies part of the enclosure as illustrated in FIG. 14. However, it is evident that during the centrifugation, the ingredient will be quickly moved by centrifuge effect on the sidewall 7 and against the filter band 72.

Preferably, the enclosure is made large enough, with a head space, to enable the substance to move to the peripheral walls during centrifugation. Preferably, the volume of the substance occupies, before centrifugation, less than 95% of the total volume of the enclosure of the capsule, more preferably less than 85% of the total volume. It can be noted that the substance can be placed in the enclosure, of any of the described capsules, as loose particles being able to flow in the enclosure freely. In an alternative, the substance can be placed as a mass of compacted particles. If the mass of particles is compacted, it is preferred that the mass has the shape of a torus so that water can enter in the centre of the torus at the inner side and then transfer to the external side of the torus by centrifugal effect. Due to the upward centrifugal vector, the torus may also be shaped to have a larger upper surface and a narrower lower surface, e.g., with a triangular cross-section, so as to better conform to the filter part of the capsule.

In another possible mode, the lid comprises a recess 16 which can be filled by a porous compressible material to provide a filtering function as well. For example, the material could be sponge or fabric.

Figure 16:
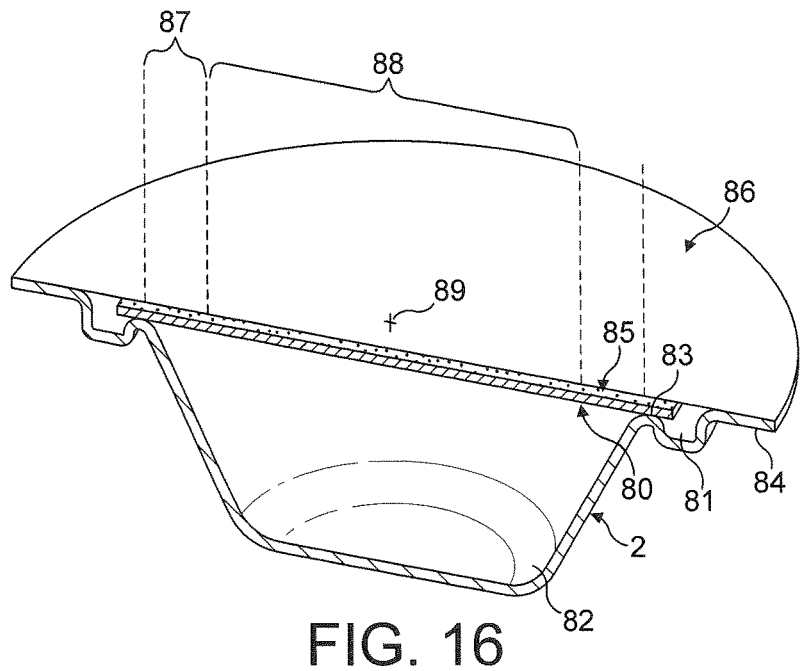
FIG. 16 is a perspective cross sectional view of a capsule (without substance inside) according to another mode of the invention.
Figure 17:
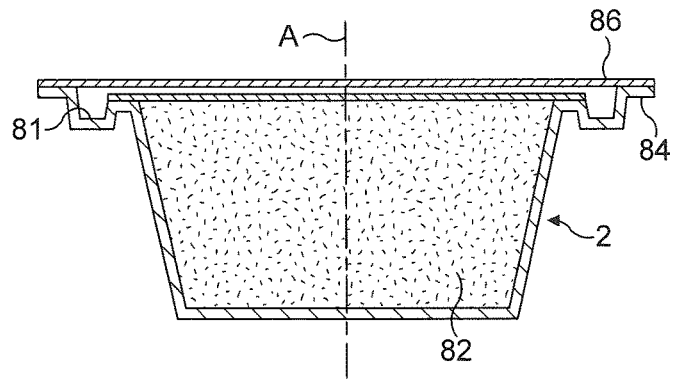
FIG. 17 is a cross sectional view of the capsule of FIG. 16.

According to FIGS. 16 and 17, the capsule in the system of the invention may also comprise an enclosure which is formed of a dished body 2 and a porous wall 80. The dished body comprises a main cavity 82 for storing the food substance and a peripheral recess 81 for receiving the liquid extract that traverses the porous wall 80 during the centrifugation process. The recess 81 is delimited by an inner edge 83 and an outer rim 84. The porous wall 80 can be attached to an inner edge 83 of the recess 81. A gastight foil membrane 86 is preferably attached onto the outer rim 84 of the body. The inner edge is preferably placed below the outer rim in order to let a free space 85 between porous wall 80 and the foil membrane 86. The porous wall can be sealed by heat or ultrasonic welding onto the inner edge 83. In order to leave a certain gap to let liquid travels to the recess, the inner edge 83 is slightly lower than the outer rim 84 onto which is sealed the outer membrane 86.

The porous wall 80 can have openings (i.e., pores) along its whole surface or along a peripheral portion of wall only. FIG. 16 shows a portion of the wall 87 of wall 80, which normally have the openings whereas the central portion 88 is free of openings. In a different mode the two portions 87, 88 of wall 80, have openings or pores. The pressure is dependent on various factors, in particular, the rotating speed of the capsule in the device, the radius at the peripheral portion of wall 87 (specially, determining the relative centrifugal force "g" at the portion 87) and the size of the openings. The size of the openings is preferably comprised between 1 and 600 microns. More preferably, the size of the openings is comprised between 10 and 200 microns forming a flow restriction means which creates a certain drop of pressure during the centrifugation of the capsule along its central axis. The overall surface area of the pores of the porous wall should be lower than 50% of the total surface area of said wall, most preferably lower than 40%.

The capsule of FIGS. 16 and 17 can be pierced in its centre 89 for injecting water in the enclosure 82 containing the substance. As a result both the outer foil 86 and the inner wall 80 are pierced. The capsule is inserted in a device as described before. The capsule is driven in centrifugal rotation at a determined speed, e.g., between 1000 and 16000 rpm, more preferably between 5000 and 12000 rpm. The brewing or dissolution process takes place in the enclosure by water traversing the substance. As a result of the centrifugal effect, the food liquid traverses the porous portion of wall 87, (eventually also part of the portion 88 if porous) and leaves the enclosure via the interspace 85 then via the annular recess 81. The liquid is allowed to leave the capsule via pierced holes made in the foil above the recess 81.

Figure 18:
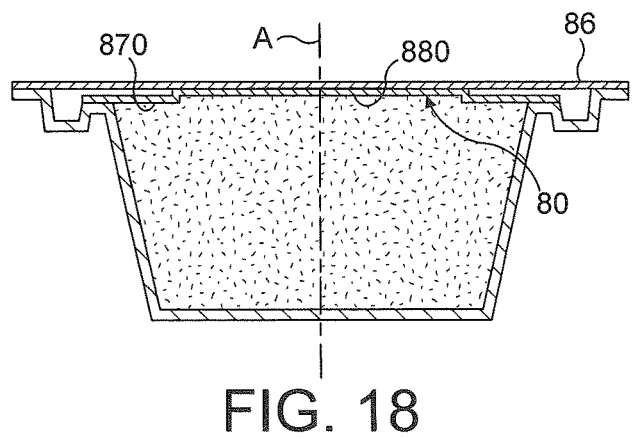
FIG. 18 is a cross sectional view of a capsule according to still another embodiment.

FIG. 18 shows a similar capsule but with the inner porous wall 80 comprising a central portion 880 which can be sealed to the external gastight foil 86 and a peripheral portion 870 which is distant from the foil 86 while leaving a small space for the filtered liquid to flow toward recess 81. In this example, the peripheral portion 870 comprises the outlet openings of the enclosure. The central portion 880 may have openings or may be free of openings. In this embodiment, no liquid is allowed to go between the outer foil 86 and the inner portion of wall 880 since both are sealed together. If a sufficient pressure drop is created at the portions of wall 870 in the capsule, the device may not necessarily be provided with an additional flow restriction means such as the valve described previously. In this case, the flow restriction means in the capsule may suffice to maintain a sufficient pressure in the enclosure. Therefore, a good interaction between the substance, e.g., ground coffee and water can be obtained by delaying the release of the liquid through the openings However, the external valve is generally preferred to better control the pressure and flow rate of the released liquid. For example, good espresso-type coffee with crema can be produced with a capsule comprising a woven polymer membrane comprising pores within a range of between 10 to 200 microns.

It can be noted that the peripheral portion of the capsule comprising the restriction means, e.g., openings, can be substantially oriented perpendicularly to the axis of rotation as in the examples of FIGS. 16 to 18 or inclined relative to said axis as in the example of FIGS. 1 to 6.

Figure 19:
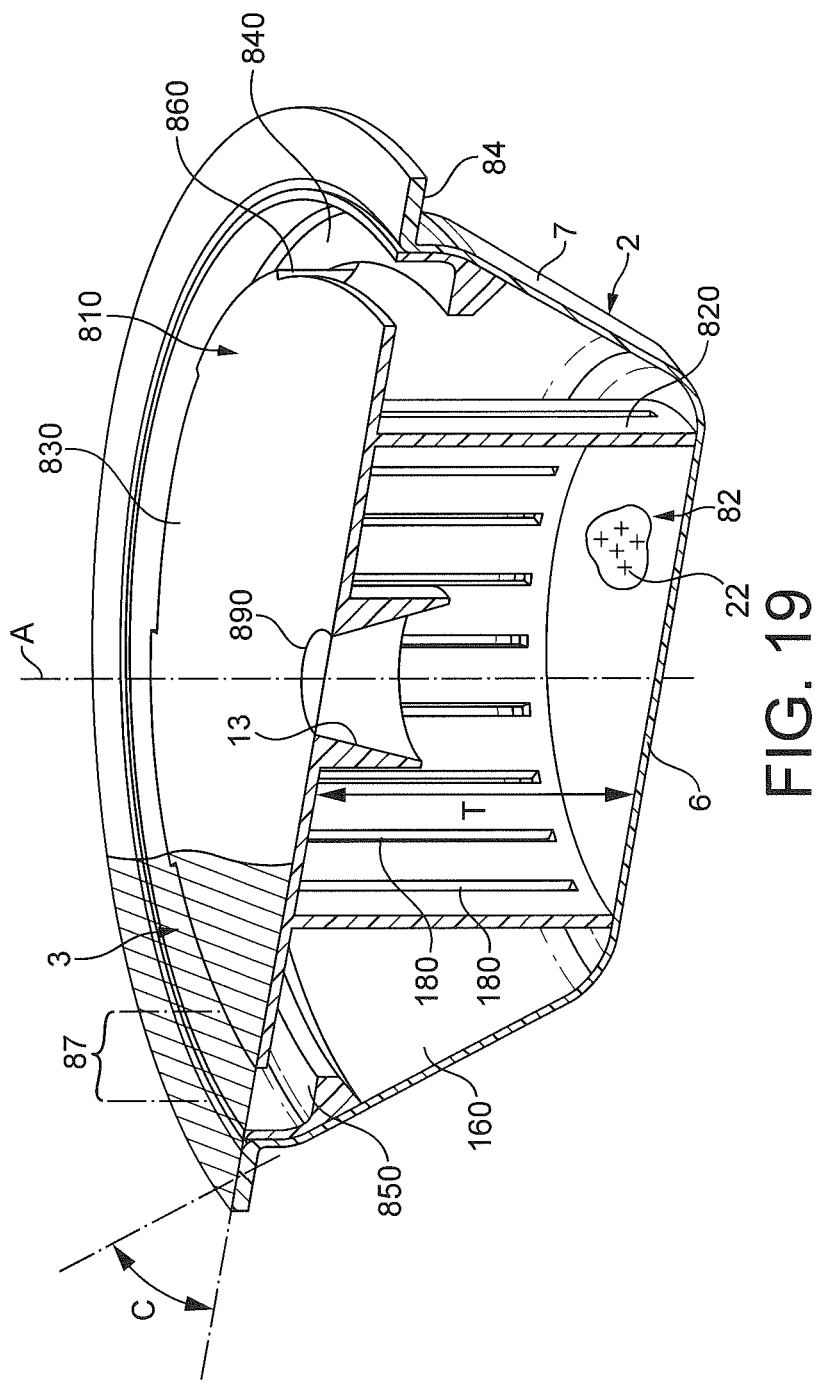
FIG. 19 is a cross sectional view of a capsule according to still another embodiment with the upper sealing membrane being removed for clarity.

In FIG. 19, another embodiment of the capsule is illustrated in which the upper sealing membrane 3 has been partially removed for clarity. The capsule comprises an upper wall formed by the foil 3, a bottom wall 6 and a sidewall 7 formed by a dished body 2. An internal lid 810 is also provided to demarcate an internal enclosure with the body 2 and secure a filter part in the capsule. The lid 810 comprises an apertured cylindrical peripheral portion 820 extending from a transversal dish 830. The cylindrical portion 820 extends substantially across the whole thickness T of the enclosure to separate the cavity 82 containing the substance from a collecting recess 160 thus demarcated by the body 2 and said portion 820. The cylindrical portion of wall 820 comprises a series of elongated slots 180 distributed at intervals through the portion of wall. The slots are placed vertically but other orientations are possible such as horizontal or inclined orientations. The slots may also be replaced partly or totally by circular openings. The portion could also have larger openings closed by a filter or microfilter membrane, e.g., of paper, woven or non-woven polymer. The upper dish 810 can extend by a support ring 840 which engages on the upper inner side of the cup-shaped body 2. The ring enables the lid to be correctly placed in the capsule and to be fixed in the capsule during handling and transport. A large annular recess 850 is maintained between the dish 810 and its ring 840 as the outer edge of the dish 810 ends before the upper edge of the ring. The recess 850 is thus closed by the membrane 3 thus delimiting an outlet region 87 intended to be pierced by external piercing means of the beverage preparation device. The outlet region extends continuously at the periphery of the capsule in an annular shape. Therefore, piercing can be carried out at any annular location of the region 87 regardless of the particular angular orientation of the capsule in the device. One may also contemplate to perform as many pierced outlets as necessary since this region 87 is continuously perforable at the periphery of the capsule. Connecting parts 860 are also distributed at the periphery of the dish to connect the dish 810 to the ring 840. It can also be noted that a second dedicated perforable region 890 of the upper wall 3 can be provided for the introduction of the water injection means. For this, the dish 810 has a central hole or a breakable part so that when a rigid injector is introduced, this membrane can be readily perforated. Hence, the construction of the capsule is particularly simple and cost effective since the lid can be produced in one single moulded plastic part. FIGS. 20 to 25 are other variants of capsules according to the invention.

Figure 20:
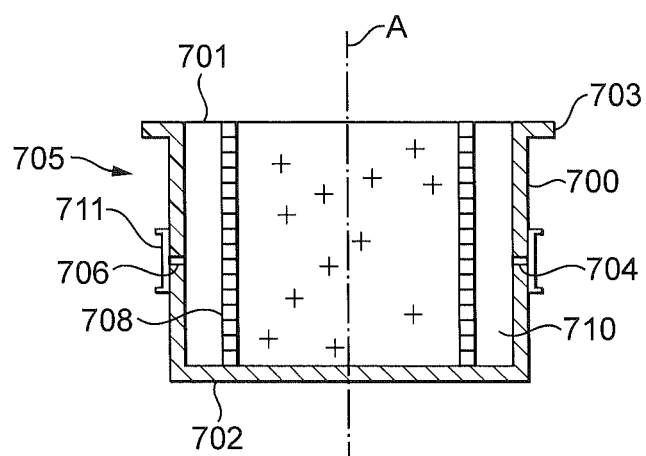
FIG. 20 is a cross sectional view of another variant for cylindrical capsule.

For example, the capsule of FIG. 20 has a cylindrical side wall 700, an upper wall 701 and a lower wall 702 both sealed or connected to the side wall 700. The capsule is gastight by choosing materials for the walls, e.g., aluminium and/or suitable plastics, which have gas barrier properties. The upper walls and lower walls can be flexible or rigid depending on said materials. For example, wall 701 can be a flexible sealing membrane welded on upper rim 703 of the body 705 forming the sidewall 700 and lower wall 702. The side wall 700 may comprise outlets 704, 706 for release of the liquid when centrifuged in the beverage preparation device around central axis A of the capsule. Optionally, the capsule may comprise a filter part 708 delimiting the cavity 709 for the substance and a collecting recess 710 peripherally placed relative to the central cavity. The filter part may, for instance, be an integral part of the body 705 or a part which is added in the capsule, e.g., a filter cylinder. The centrifuged liquid passed through the cylindrical wall 700 in outlets 704, 706 positioned, for example, at about the median transversal plane of the capsule. A series of outlets can be distributed at intervals around the side wall 700. The outlets may be already pre-made in the wall 700 and covered by a gastight sealing membrane 711. The sealing membrane can be a flexible band surrounding the wall which can be pierced at the outlets, cut or removed, e.g., peeled off, by the user for uncovering the outlets before it is inserted in the centrifugal brewing device. The size of the outlets can be small enough to provide a flow restriction to the liquid.

Figure 21:
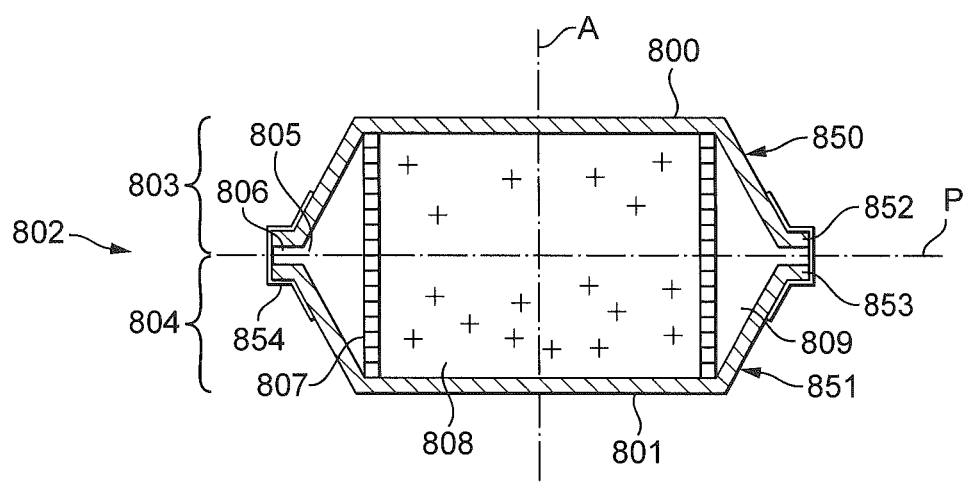
FIG. 21 is cross sectional view of another variant for capsule with a V-shaped side wall.
Figure 22:
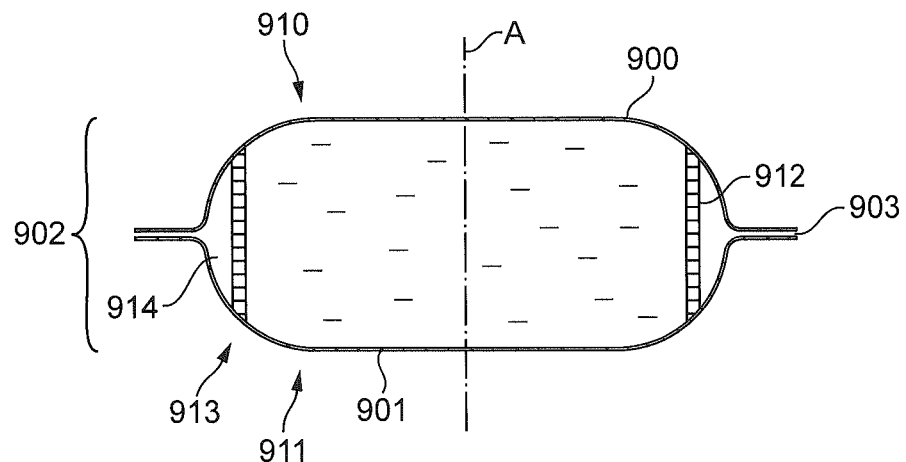
FIG. 22 is a cross sectional view of another variant for a capsule with a U-shaped side wall.

The capsule of FIG. 21 is another possible embodiment. The capsule is formed of an upper wall 800, a lower wall 801 and a sidewall 802 connecting the upper and lower walls wherein the side wall is formed of two truncated portions 803, 804 with their larger section or base being connected towards the transversal median plane P of the capsule. Hence, the assembly formed by the two truncated portions form a vertex 805 at which outlets 806 for the beverage can be provided. In addition, a filter part 807 can be provided in the capsule which also delimits a cavity 808 for receiving the substance and a collecting recess 809 for the centrifuged liquid. As a matter of specific construction, the filter part can be, for instance a rigid tubular member which is inserted between two-half shelves 850, 851 forming the walls 800, 801, 802. The shelves 850, 851 can be made of moulded plastic. The filter part can be made of moulded plastic or of a more complex structure such as a combination of a plastic support frame and a porous filter membrane. The outlets 806 can be formed at the interface of the shelves by small radial channels formed in each shelf for instance. The channels can be distributed at angular intervals at the periphery in the sealing rims 852, 853 of the shelves. Hence, the outlets are formed by aligning the channels of each shelves and, e.g., by heat or ultrasonic sealing or adhesive bonding of the shelves 850, 851 at the rims 852, 853. For instance, 4 to 10 outlets could be provided of a section of about 1-10 mm$^2$ each. In order to maintain the enclosure of the capsule protected against the external atmosphere till the use of the capsule, the outlets can be closed by a sealing protective membrane 854, e.g., forming a band surrounding the vertex area or rims 852, 853 of the shelves. The membrane can be removed, pierced or cut just before the centrifugation operation in the device either by the user or by the device itself.

Figure 23:
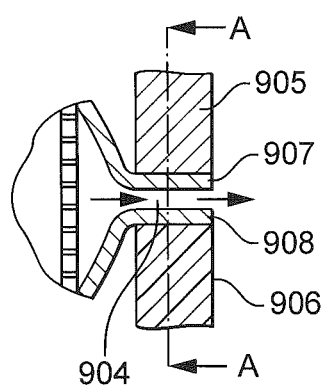
FIG. 23 shows a detail of the capsule of FIG. 22 during centrifugation in a beverage preparation device.
Figure 24:
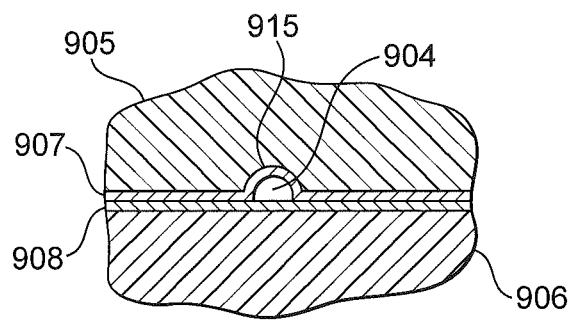
FIG. 24 shows a detail of the capsule of FIG. 22 along direction A of FIG. 23.
Figure 25:
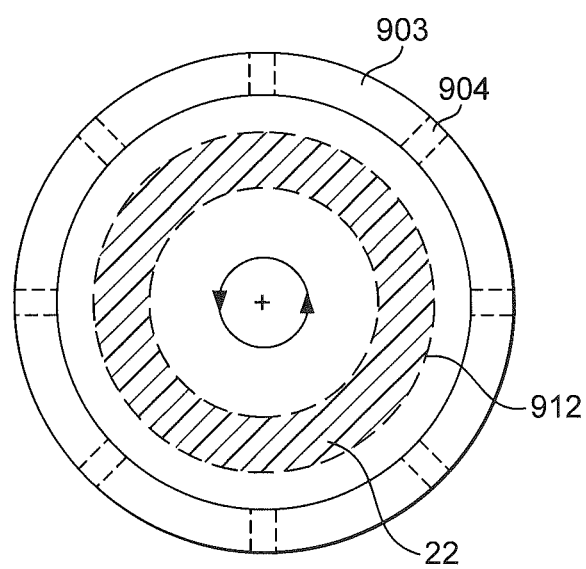
FIG. 25 is a top view of the capsule of FIGS. 22 to 24 during centrifugation.

Of course, the capsule could have other shapes without departing from the scope of the invention. For instance, the sidewall could be designed stepwise, i.e., with gradually increasing steps in direction of the transversal median plane (not illustrated). According to FIGS. 22 to 25, the capsule according to this embodiment, comprises an upper wall 900, a lower wall 901 and a sidewall 902 connecting the upper and lower walls, preferably along a peripheral sealing edge 903. The sealing edge is designed to open as a result of the pressure of liquid which applies against it. Upon opening as illustrated in FIG. 23, one or more outlets 904 are formed. The size of the outlets during opening may be controlled by rim's engaging surfaces 905, 906 of the beverage preparation device or alternatively by a rigid flow control member as a part of the capsule itself (not illustrated). As shown in FIGS. 23 and 24, the sealing edge opens in two plies 907, 908 which abut against the engaging surfaces 905, 906 under the effect of the liquid exiting the capsule. The design of the surfaces 905, 906 will determine the form of the outlets. For instance, flat continuous surfaces 905, 906 over the whole perimeter of the rim and distanced from a controlled gap will provide a continuous outlet for distributing a 360-degree liquid jet toward the impact wall of the beverage production device. On the contrary, at least one of the engaging surfaces 905, 906 may be provided with discrete radially oriented channels 915 of controlled depth enabling to form discrete liquid outlets of controlled size at the flange like rim of the capsule.

The surfaces 905, 906 could be fixed or spring biased to control the degree of opening of the outlets as a function of the rotational speed. The capsule according to this embodiment can be made of rigid or flexible shelves 910, 911 which are scaled at said 90 in a breakable or openable manner to form the outlets. For instance, the two shelves 910, 911 can be gastight flexible foils made of polymer with or without an aluminium layer or an EVOH barrier layer. A filter part 912 can be inserted in the capsule to delimit the enclosure for the substance 913 and the collecting recess 914. For instance, the filter part can be a porous tubular member which can form a support ring for maintaining the upper and lower walls of the shelves at distance.

In any of the described modes, the flow restriction can be obtained or complemented by chicanes in the capsule and/or in the device or a similar structure forming a tortuous flow path for the liquid.

The system capsule of the invention provides remarkable brewing results with solid contents which are higher than with usual systems. The results are very reproducible from capsule to capsule. Surprisingly, crema is also remarkably improved with a creamier, more stable and thicker texture.

It can be noted that the pressure drop of the restriction means can be measured by a pressure measurement test consisting of filling water under pressure in the capsule and measuring the pressure of water at the injection point at which liquid is allowed to pass the restriction means, i.e., the valve system.

EXAMPLE

A capsule according to the embodiment of FIGS. 1 to 6 was filled with 6.5 grams of ground coffee. The coffee was ground at an average particle size ($D_{4,3}$) of 260 microns. A prewetting of the capsule was carried out during a few seconds. During centrifugation at about 8000 rpm, the flow rate was controlled at about 2 grams per second. A volume of 40 grams of coffee extract was delivered in an espresso cup. The liquid extract had a total solids (TC) of about 4%, a yield of about 25%. The layer of crema at the top was of about 5-6 mm. The foam looked very dense with very fine bubbles and was very stable over time.

Of course, the invention may encompass many variants which are included in the scope of the patent claims that follow.

What is claimed is:

1. A single-use capsule for preparing a food liquid from a food substance contained in the capsule, comprising:
    an upper wall,
    a lower wall,
    side walls attached respectively to the upper and lower walls, wherein the upper, lower and side walls form an enclosure that contains a predetermined amount of the food substance,
    a sealed interface connecting the side walls;
    a food liquid collecting cavity located between the side walls and sealed interface; and
    a filter which separates the food substance from the liquid collecting cavity, wherein the filter comprises a porous tubular member which forms a support ring in contact with the upper and lower walls for maintaining the upper and lower walls at a predetermined distance and which filters the food liquid before the food liquid enters the collecting cavity;
    wherein the sealed interface is configured to allow the food liquid to leave the capsule from the collecting cavity through one or more openings in the interface upon application of a predetermined fluid pressure in the capsule.

2. The capsule of claim 1, wherein the sealed interface opens as a result of the fluid pressure forming one or more outlets in the sealed interface for allowing the food liquid to leave the capsule.

3. The capsule of claim 2, wherein the fluid pressure opens the sealed interface to provide a continuous peripheral slot through which the food liquid leaves the capsule.

4. The capsule of claim 1, wherein the sealed interface comprises two enclosing members associated with the upper and lower walls respectively with the members connected at a sealed junction.

5. The capsule of claim 4, wherein at least one of the two enclosing members is provided with a plurality of discrete radially oriented channels of controlled dimensions that when subject to the fluid pressure allow the food liquid to leave the capsule.

6. The capsule of claim 5, wherein the plurality of channels are arranged symmetrically about the sealed interface of the capsule.

7. The capsule of claim 1, wherein the side wall comprises flow restriction means that maintains the pressure in the food substance to retard the release of the food liquid.

8. The capsule of claim 1, wherein the sealed interface forms a circular perimeter for the capsule.

9. The capsule of claim 8, wherein the side wall is substantially perpendicular to the upper and lower walls.

10. The capsule of claim 9, wherein the side wall is substantially cylindrical to form with the upper and lower walls a disc shaped cavity that holds the food substance therein.

11. The capsule of claim 10 wherein the sealed interface is located in a central portion of the sidewall and includes one or more openings sealed by a removable membrane which is to be removed prior to use.

12. The capsule of claim 11 wherein the removable membrane is configured as a band that is attached to the capsule exterior adjacent the one or more openings.

13. The capsule of claim 1, wherein the food substance comprises ground coffee.

14. The capsule of claim 1, further comprising a flow restriction structure that retards the food liquid that is attempting to leave the capsule.

15. A method for preparing a food liquid from a food substance contained in the capsule of claim 1, which comprises introducing water into the capsule; passing the water through the food substance using centrifugal forces for producing the food liquid which is centrifuged peripherally in the capsule relatively to a central axis of the capsule corresponding to an axis of rotation during the centrifugation, and delivering the food liquid from the capsule through the interface from the application of the fluid pressure in the capsule to allow the food liquid to leave the capsule through the opened interface.

16. The method of claim 15, wherein the sealed interface opens in response to the predetermined fluid pressure to form one or more outlets for the food liquid.

17. The method of claim 15, wherein the sealed interface opens in response to the predetermined fluid pressure to provide a continuous peripheral slot through which the food liquid leaves the capsule.

18. The method of claim 15, wherein the sealed interface comprises two enclosing members associated with the upper and lower walls respectively with the members connected at a sealed junction and which further comprises providing at least one of the enclosing members with a plurality of discrete radially oriented channels of controlled dimensions that fonn discrete liquid outlets of controlled size in response to the predetermined fluid pressure.

19. The method of claim 15, wherein the capsule is designed to cooperate with a centrifugal capsule rotation device that includes engaging surfaces, wherein the sealed interface comprises two enclosing members associated with the upper and lower walls respectively with the members connected at a sealed junction, and wherein the method further comprises controlling outlet size during opening by the engaging surfaces of the device.

20. The method of claim 19, which further comprises fixing or spring biasing the engaging surfaces to control the degree of opening of the outlets as a function of the rotational speed of the device.

21. The method of claim 15 wherein the side wall comprises flow restriction means that maintains the pressure in the food substance to retard the release of the food liquid.

22. The method of claim 15 wherein the side wall comprises a filter of a porous tubular member to filter the food liquid before the food liquid leaves the capsule.

23. The method of claim 15, which further comprises retarding the food liquid that is attempting to leave the capsule by including in the capsule flow restriction means.

24. The method of claim 15 wherein the food substance comprises ground coffee and the food liquid comprises coffee having a crema that is more creamier and more stable with a thicker texture that non-centrifugally prepared coffee.

* * * * *

UNITED STATES PATENT AND TRADEMARK OFFICE
CERTIFICATE OF CORRECTION

PATENT NO. : 9,731,892 B2  
APPLICATION NO. : 14/619841  
DATED : August 15, 2017  
INVENTOR(S) : Yoakim et al.

Page 1 of 1

It is certified that error appears in the above-identified patent and that said Letters Patent is hereby corrected as shown below:

In the Claims

Column 24:
Line 3 (Claim 18, Line 7), before "discrete", delete "fonn" and insert -- form --.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*